United States Patent
Meyer et al.

(10) Patent No.: US 8,958,698 B2
(45) Date of Patent: Feb. 17, 2015

(54) VERSATILE REMOTE CONTROL DEVICE AND SYSTEM

(75) Inventors: Michael Meyer, New York, NY (US); Zane Coleman, Elmhurst, IL (US)

(73) Assignee: Transmitive, LLC, New York, NY (US)

(*) Notice: Subject to any disclaimer, the term of this patent is extended or adjusted under 35 U.S.C. 154(b) by 346 days.

(21) Appl. No.: 13/561,320

(22) Filed: Jul. 30, 2012

(65) Prior Publication Data
US 2012/0288283 A1 Nov. 15, 2012

Related U.S. Application Data

(63) Continuation of application No. 13/250,545, filed on Sep. 30, 2011, now Pat. No. 8,233,803.

(60) Provisional application No. 61/388,095, filed on Sep. 30, 2010.

(51) Int. Cl.
*H04B 10/00* (2013.01)
*H04N 21/422* (2011.01)
*G08C 17/02* (2006.01)
*G08C 23/04* (2006.01)

(52) U.S. Cl.
CPC .......... *H04N 21/42226* (2013.01); *G08C 17/02* (2013.01); *G08C 23/04* (2013.01); *H04N 21/42206* (2013.01)
USPC ............................ 398/106; 398/109; 398/115

(58) Field of Classification Search
USPC .......................... 398/106, 109, 107, 108, 115
See application file for complete search history.

(56) References Cited

U.S. PATENT DOCUMENTS

| | | | | |
|---|---|---|---|---|
| 4,727,600 A | * | 2/1988 | Avakian | 398/126 |
| 8,233,803 B2 | * | 7/2012 | Meyer et al. | 398/106 |

* cited by examiner

*Primary Examiner* — M. R. Sedighian
(74) *Attorney, Agent, or Firm* — Bryan Cave LLP

(57) ABSTRACT

A radio-frequency (RF) remote control (10) has a user interface and transmits an RF signal (11) which designates a device (14) to be controlled and a command for that device. The RF signal is received by an intermediary device (12). The intermediary device, in turn, generates and broadcasts a plurality of high-power IR signals (13A-13F). These signals may be received directly by a controlled device (14A) or may be received indirectly by a controlled device (14B, 14C) after one or more reflections from objects (16A, 16B) and/or room surfaces (18). Thus, reliable control of the devices (14) is obtained even in situations where merely transmitting a typical IR signal may not provide reliable control of the device (14).

21 Claims, 17 Drawing Sheets

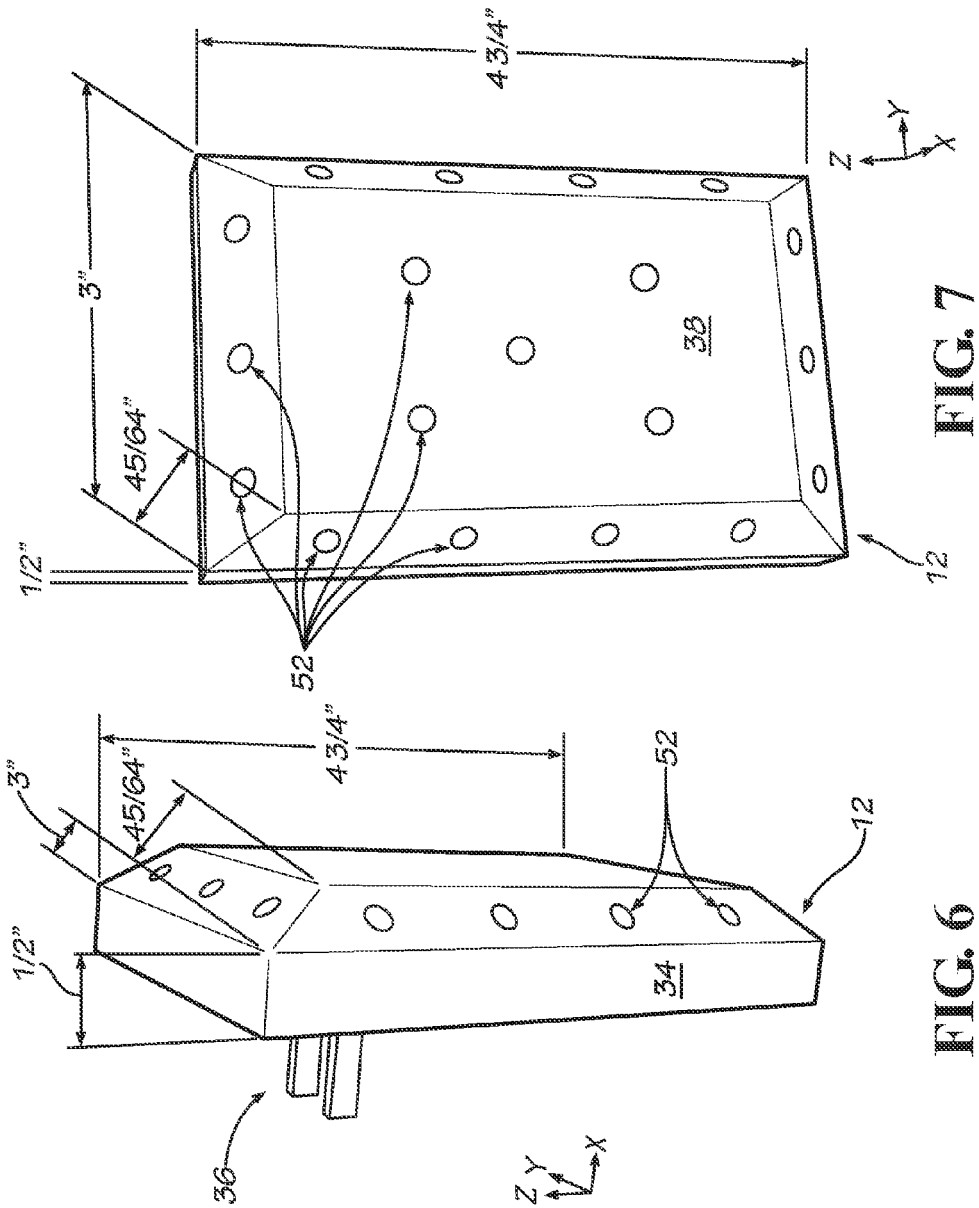

VERSATILE REMOTE CONTROL DEVICE AND SYSTEM

CROSS-REFERENCE TO RELATED APPLICATION

This application is a continuation of U.S. application Ser. No. 13/250,545, filed Sep. 30, 2011 now U.S. Pat. No. 8,233,803, which claims priority of U.S. provisional patent application No. 61/388,095, filed Sep. 30, 2010, the disclosures of which are hereby incorporated by reference in their entireties herein.

TECHNICAL FIELD

This invention generally relates to wireless remote control devices and remotely-controlled devices and, more particularly, to such devices in environments where standard infrared (IR) communications techniques perform poorly or are burdensome to use.

BACKGROUND

Most handheld remote control devices rely on infrared (IR) communication techniques and are typically battery-powered. Manufacturers have therefore engineered these remote controls to be as power-efficient as possible in order to prolong battery life. One primary way of prolonging battery life is to limit the power of the emitted IR signal by choosing low-power IR light emitting diodes (LEDs). Another way of prolonging battery life is to get the maximum benefit with the least amount of IR power by choosing IR light emitting diodes (LEDs) which have a very narrow angle of radiation. Thus, most of the IR power is directed along the optical axis of the LED, which provides line-of-sight transmission but only within a small angle. "Line-of-sight", as used herein, means direct line-of-sight, that is, an unobstructed direct path with no reflections or obstructions. Also, many handheld remote control devices use both of these techniques to conserve power and maximize battery life.

This low power, focused, line-of-sight IR transmission scheme, however, is not without problems. IR communications are easily blocked by most objects, including furniture, a person who may be passing between the sensor and the controlled device, and even a wayward foot propped up on a pillow which happens to be between the remote control and the controlled device.

Users try to compensate for this problem by, for example, holding the remote control to one side or the other to send the signal around the intervening object while still aiming in the general direction of the controlled device. This approach, however, is often unsatisfactory because the narrow angle of radiation requires aiming with some degree of accuracy. Thus, two or even three attempts to perform a function, such as changing the channel, may be required.

Furthermore, although IR signals may be reflected off of certain surfaces, the power of the IR signal, while being adequate for line-of-sight transmission, is often inadequate for a signal which must be reflected or scattered off of another surface to avoid an intervening object and arrive at the controlled device. Thus, simply pointing the remote toward, for example, a wall in the hope that the reflected IR signal will have sufficient strength to affect the desired device is often not successful.

Also, some persons have large-screen TVs, elongated living rooms, and even in-home projection/theater systems. In these cases the available IR power may be inadequate to reliably traverse the distance between the remote control and the controlled device even if line-of-sight transmission is not a problem.

These problems are often exacerbated when a wireless touch-screen type IR remote control is used. This type of remote control requires the user to look at the screen on the remote control to be sure that the user is pressing on the correct screen area or icon while simultaneously pointing the remote control directly at the controlled device. This usually means holding the remote control in a low position so that it is easily viewed, which increases the likelihood that an intervening object will block the transmission. To avoid this problem, some persons have resorted to gymnastics such as holding the touch-screen device overhead so as to be above intervening objects, but with the screen pointing downward so that the user can look up to see the screen/icon and still be able to discern that the remote control is pointing toward the controlled device.

Furthermore, each controlled device is responsive only to IR commands sent by a compatible device. This usually means separate remote controls for each piece of equipment (e.g., a TV, a Blu-Ray Disc player, cable TV converter box, and an audio amplifier), and the sheer number of remote controls, and often their similarity in appearance, create confusion for many users. Also, each remote control needs its own batteries and must be pointed at its own controlled device: pointing the disc player remote control at the TV may not work if the disc player is not immediately adjacent to the TV. In order to reduce the number of remote controls which the user must have at the ready, there are "universal" remote controls which can control the multiple pieces of equipment. The user presses a button to select the desired device to be controlled, such as the disc player, and then presses the button to perform the desired function, such as pause, play, etc. These remote control devices also typically use low-power, narrow-bandwidth IR transmissions and are therefore subject to the same problems discussed above. For example, if the user wishes to control the disc player the user must remember to point the remote control at the disc player, not at the TV. The use of a universal remote control can also cause another problem when it is used to simultaneously turn on (or off) such multiple pieces of equipment that are not tightly grouped together. The All Power On/Off button is typically a power toggle command, so that a signal is sent to the controlled device instructing it to change states, that is, from the "on" state to the "off" (standby) state, or vice versa. As long as all devices receive the commands and they are all in sync (all on, or all off) then everything is fine. More common, however, is that pressing the All Power On/Off button often begins a frustrating experience for the user. For example, the user may come in after a hard day's work and, wanting to relax, sits down in front of the TV and presses the All Power On/Off button. Because of how the user is pointing the remote control, or because of the difference in distances between the remote control and the controlled devices, or because of different sensitivities of the controlled devices, the IR command signals sent by the universal remote control are only detected and acted upon by some of the devices so that, for example, the TV turns on, but the disc player does not. So, the user points the remote control more directly at the disc player and presses the All Power On/Off button again. Success? Not really. The disc player receives the power toggle command and turns on but, unfortunately, the TV set has also received the power toggle command, so it now obediently turns off The user presses this button again, and the disc player and TV obediently reverse their states, the TV is on again, but the disc player is off again. In order to get the devices synchronized (both on, or both off), the user has to select the individual device on the remote control and then press the power button to get that particular device into the same state (on or off) as the other devices. This is usually a very frustrating experience, especially for users who are not tech-savvy and who do not understand that the power button is actually a power toggle button, and even for tech-savvy users who simply want to sit down and watch a movie with as little effort as possible. In situations where the various devices to be controlled are in widely separated locations, such as where the IR input for a home projection system or audio amplifier is in the back of the room but the disc player is in the front of the room, a standard IR universal remote control may be virtually useless.

Some prior art systems have attempted to address some of these problems by using a radio frequency (RF) remote control to transmit a control signal to an RF-to-IR converter box which has an RF receiver and LEDs therein. This converter box is then placed in front of the device to be controlled so that the LEDs on the box point directly into the IR sensor on the controlled device. This, however, has several disadvantages. For one, most persons would consider such an added box to be unsightly, at best. For another, there must be shelf space in front of the controlled device which is adequate for placement of the converter box. For yet another, the converter box requires an additional outlet. If one has four such converter boxes this would require four more outlets—in other words, most of the outlets in a typical power strip. And for another, each such converter box adds to the home power consumption. Although one box might only draw, for example, 15 watts, four such boxes would draw 60 watts, equivalent to leaving a 60-watt bulb burning day and night, thereby increasing electrical power consumption and increasing the loading on the home air conditioning system.

In an attempt to avoid the shelf space problem, some such systems have used converter boxes with the LEDs connected through an electrical cable to the converter box. This, however, leaves other problems unaddressed. Also, the LEDs and wires may still be considered unsightly by many, and a new problem has been created: how to reliably attach the LEDs to the front of the controlled device.

These problems are compounded if the user also wants to be able to occasionally use the original remote control with that device. In this situation the converter box or the wired LEDs would block the IR signal from the original remote control so they must be moved or removed in order to use the original remote control, and then replaced at a later time.

SUMMARY

An infrared light emitting device to control infrared receiving devices has a base plane and a longitudinal axis substantially perpendicular to the base plane, and includes a radio frequency receiver to receive and demodulate a radio frequency control signal to provide a demodulated control signal, a processor functionally coupled to the radio frequency receiver to receive the demodulated control signal and to generate a corresponding drive signal, a plurality of infrared light sources functionally coupled to the processor and responsive to the drive signal to generate a plurality of modulated infrared light emissions to control the infrared receiving device, each of the infrared light sources having an optical axis, a first group of the plurality of infrared light sources being disposed on the infrared light emitting device such that the optical axis of each of the plurality of infrared light sources in the first group is at a different angle with respect to the longitudinal axis, the modulated infrared light emissions having sufficient power that the modulated infrared light emissions can reflect off at least one surface and still control the infrared receiving device, and a power supply to provide operating power to the radio frequency receiver, the processor, and the plurality of infrared light sources.

A system to control infrared receiving devices has an infrared light emitting device and controlling device. The infrared light emitting device has a base plane and a longitudinal axis substantially perpendicular to the base plane, and includes a radio frequency receiver to receive and demodulate a radio frequency control signal to provide a demodulated control signal, a processor functionally coupled to the radio frequency receiver to receive the demodulated control signal and to generate a corresponding drive signal, a plurality of infrared light sources functionally coupled to the processor and responsive to the drive signal to generate a plurality of modulated infrared light emissions to control the infrared receiving device, each of the infrared light sources having an optical axis, a first group of the plurality of infrared light sources being disposed on the infrared light emitting device such that the optical axis of each of the plurality of infrared light sources in the first group is at a different angle with respect to the longitudinal axis, the modulated infrared light emissions having sufficient power that the modulated infrared light emissions can reflect off at least one surface and still control the infrared receiving device, and a power supply to provide operating power to the radio frequency receiver, the processor, and the plurality of infrared light sources. The controlling device has a user interface to receive commands for controlling the one or more infrared receiving devices, and a transmitter to transmit the commands to the infrared light emitting device.

A method to control infrared receiving devices includes receiving operating power from an electrical power receptacle. receiving and demodulating a radio frequency control signal to provide a demodulated control signal, generating a drive signal corresponding to the demodulated control signal, and generating a plurality of modulated infrared light emissions to control the infrared receiving device by functionally coupling the drive signal to a plurality of infrared emitting diodes oriented in a plurality of directions, the modulated infrared light emissions having sufficient power that the modulated infrared light emissions can reflect off at least one surface and still control the infrared receiving device.

BRIEF DESCRIPTION OF THE DRAWINGS

FIGS. 6 and 7 illustrate perspective view of an embodiment of an intermediary device in the shape of a truncated polyhedron.

DETAILED DESCRIPTION

The features and other details of the invention will now be more particularly described. It will be understood that particular embodiments described herein are shown by way of illustration and as examples, but not as limitations of the invention. The terms "LED" and "IR LED" are both used herein but, unless stated otherwise, references to an "LED" mean an "IR LED".

Figure 1A:
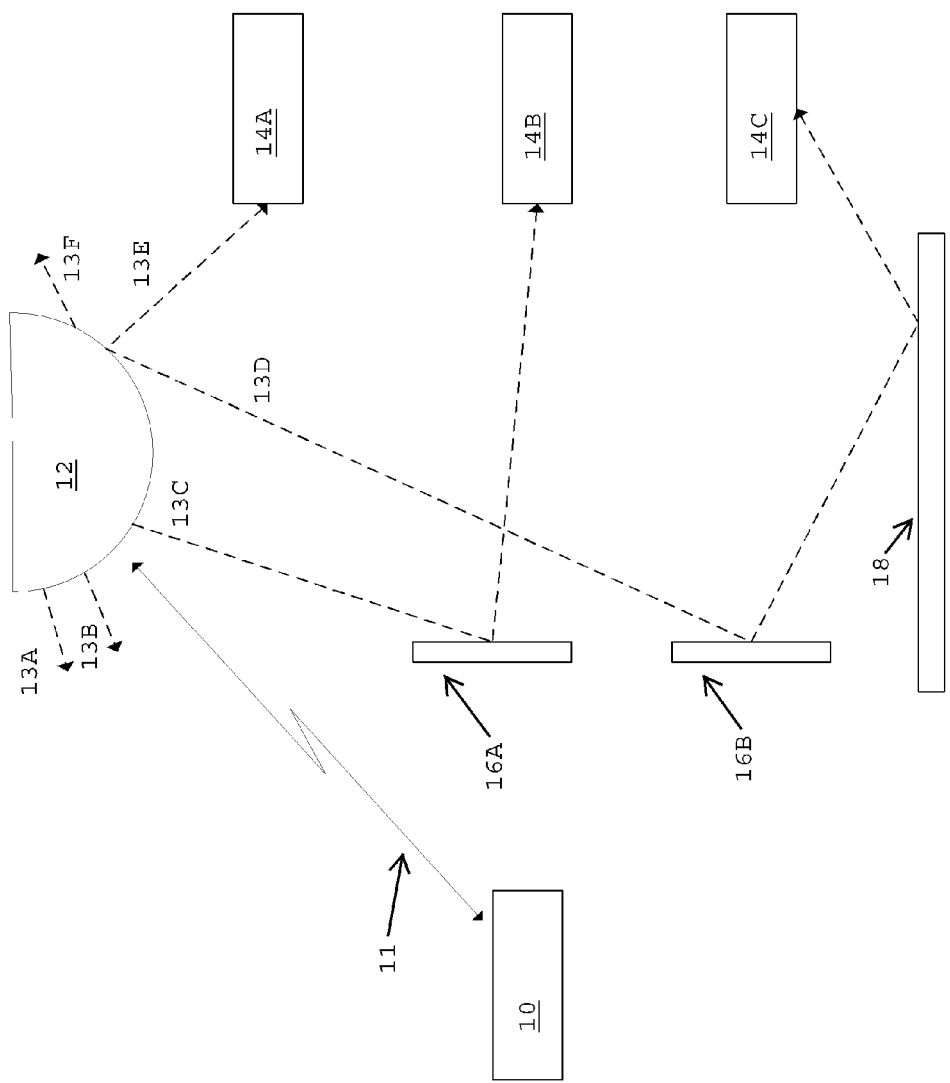
FIG. 1A is a diagram illustrating an exemplary environment in which the present invention may be used.

FIG. 1A is a diagram illustrating an exemplary environment in which the present invention may be used. An intermediary device 12 interacts with modern computing devices 10, such as a handheld device, a tablet, or a laptop, to provide the ability to control infrared-receiving devices 14 (e.g., media devices such as televisions, receivers, cable boxes, DVD players, etc.). The intermediary device 12 (which is a high-power IR light emitting device) according to certain embodiments may utilize an IR LED "cluster". A cluster, as used herein, is not limited to a small group of closely-spaced IR LEDs, but also includes a plurality of IR emitting diodes, preferably but not necessarily surface-mounted. The intermediary device 12 may be plugged into an available electrical power receptacle such, but not limited to, an electrical AC wall outlet such that it is mounted on the wall. Traditional remote control devices, on the other hand, are battery-powered and tend to use only one or two LEDs and, as a result, are limited in the power of the signal they produce, the beamwidth of the signal they produce, and the distance of reliable operation with respect to the receiving device 14. The use of a plurality of high-powered LEDs, deriving their operating power from an AC receptacle, according to one embodiment, preferably increases the power and operational range of the transmitted IR signals so as to facilitate and accommodate intentional and unintentional IR signal "bouncing" (reflecting) off the walls, the ceiling, and/or the floor (including 'double-bouncing' and 'triple-bouncing') before the signal is received by the infrared sensors on the infrared-receiving device 14. Thus, the limitations of the prior art are overcome.

The IR light emitting device 12 may transmit the IR radiation in a spherical, semi-spherical, anisotropic, non-uniform, or other desired pattern, sending a strong and dispersed infrared signal in an angular range of directions. This maximizes the chance of signal reception regardless of the distance or the room(s) configuration, and eliminates the need for line-of-sight transmission and its inherent limitations. The intermediary device 12, according to certain embodiments, is preferably equipped with an RF transceiver using commonly-known techniques (such as, but not limited to, Wi-Fi, ZigBee, Bluetooth, WiMax, WiMedia UWB), a processor, embedded software, and the cluster of high-power IR LED diodes that generate the infrared signal transmission. The intermediary device 12 may be embodied as a compact package that resembles a classic plug-in "night light" or "wall wart"; i.e., something that is preferably directly plugged into an electrical wall, floor or ceiling outlet.

According to certain embodiments, more IR light may be emitted in a preferred orientation, angular range or direction(s) relative to the orientation of the device itself (or a component on the device such as a plug on the device), or relative to an electrical wall outlet, such that the primary direction of transmission is up toward the ceiling, or back toward the wall into which the device is plugged.

By providing a small, plug-in, multidirectional, high-power, IR light emitting device 12, with a signal output strong enough that it can be received by equipment 14 after bouncing off one, two, three or more walls and/or surfaces, certain embodiments overcome limitations typically encountered by prior art devices, such as are identified above, including line-of-sight requirements. The high power IR transmission may be considered to be an ambient IR pulse, whereby the room configuration and the direction of pointing have little, if any, adverse effect. For example, the intermediary device 12 can be hidden behind a couch. In addition, any computing device with RF transmission capabilities can serve as a remote control in order to control infrared-receiving devices 14 (such as media devices) through the intermediary IR light emitting device 12.

Certain embodiments herein relate to seamless control of a multimedia system. Such a system might include, for example, IR-receiving devices which do not respond to RF signals, RF-receiving devices which do not respond to IR signals, devices which can send and receive both RF and IR signals, or any combination thereof. A universal remote application can be installed on the remote control device 10 to allow it to communicate with the intermediary device 12 through RF transmissions including, for example, but not limited to, microwave transmissions, and via Wi-Fi, ZigBee, Bluetooth or other wireless communication standards. Accordingly, a user can utilize almost any platform (e.g., smartphones, game controllers, iPhone, iPad, iPod Touch manufactured by Apple Inc., BlackBerrys manufactured by Research In Motion Limited, laptops, desktops or any other device having wireless capabilities or connected through a wired network) to control infrared-receiving devices, radio frequency-receiving devices, or a combination thereof.

As illustrated in the exemplary embodiment of FIG. 1, the user may employ any of a wide variety of wireless device 10 (such as but not limited to, a handheld device, a tablet, laptop, etc.) to control a variety of infrared-receiving devices 14 such as media equipment through an intermediary light emitting device 12. To this end, a user enters commands on the controlling device 10, which in turn communicates these commands wirelessly (e.g., via RF) to the intermediary device 12. In response, the intermediary device 12 emits multidirectional, high-powered IR signals that are received by the device(s) 14 to be controlled. As can be seen, certain IR signals that are emitted by the intermediary device 12 may be received by the device(s) 14 to be controlled without regard to the direction in which the controlling device 10 is pointing and without regard to room configuration or any obstructions that may lie between the controlling device 10, intermediary device 12 and devices 14 to be controlled. This is in part due to the number, configuration and/or orientation of IR-emitting diodes that are disposed on the intermediary device 12, which is preferably plugged into an electrical receptacle so as to derive sufficient power for the transmitted IR signals to be effective. The use of a plurality of high-powered LEDs deriving power from an AC receptacle, for example, provides that the emitted IR signals reflect or bounce off various items such as walls, the ceiling, the floor, intervening obstructions, or items disposed in a room, before being received by the infrared sensors on the devices 14 to be controlled.

In other embodiments, the intermediary IR-emitting device 12 may be plugged into, or mounted on or to, other devices, such as a remote control, smart phone, handheld gaming console or game controller. In further embodiments, the intermediary device 12 may be integrated with or into content serving/displaying or home automation devices 14. For example, the intermediary device 12 components described above (e.g., the cluster of high-power IR diodes) may be integrated into a content serving or content displaying device 14 such as a cable box, DVR, internet video box (e.g., Apple TV, Vudu, or Roku), or any cable, satellite or internet-connected media device. In certain embodiments, the intermediary device 12 components described above (e.g., the cluster of high-powered diodes) may be integrated into a computer, a gaming device or console, or a networking device such as transmitters or repeaters (e.g., a router). In certain embodiments, the intermediary device 12 may receive control commands through a wired power line networking (PLN) channel. For example, the intermediary device 12 may receive control commands through the existing household electrical power wiring network to which the device is plugged using IEEE 1901 (e.g., HomePlug AV) or ITU-T G.hn G.9960 standards. The intermediary device 12 then emits, using the diode cluster, multidirectional, high-power, IR signals that can be received by the equipment 14 after bouncing off one or more walls and/or surfaces.

The intermediary device 12 preferably has a small form factor, as illustrated in several of the exemplary embodiments disclosed herein. The size and configuration of the intermediary device can be such that it can be disposed at almost any location, including locations that are counter-intuitive or hidden out of the way, such as behind objects (e.g., furniture).

Still referring to FIG. 1A, a remote control 10 is used to control one or more devices 14A, 14B, 14C, such as a TV, disc player, cable TV converter box, audio amplifier, etc. One or more obstructions 16A, 16B are present between the remote 10 and the devices 14 and prevent direct line of sight communication between the remote control 10 and the devices 14. In this environment, when the user (1709 in FIG. 17) presses a button on the user interface 20F on the remote control 10, the remote control broadcasts a wireless signal 11. This signal 11 is preferably a radio frequency (RF) signal and is preferably broadcast in an omnidirectional or at least a wide-angled manner although, for clarity of illustration, the RF transmission is just shown as a single line. The term "radio frequency" includes frequencies up to, but not including, IR and shorter wavelengths. Thus, microwaves are RF signals. The intermediary device 12 receives the RF signal 11 and, in response, generates a plurality of IR signals 13A-13F. These IR signals 13 are preferably identical, that is, they contain the same instruction. These IR signals 13 are broadcast in a plurality of directions, and are preferably of a substantially higher power than the IR signal broadcast by a typical remote control. This helps to assure that the instruction from the user is reliably received by the controlled device 14. For example, IR signal 13E has a direct, line-of-sight path to device 14A; IR signal 13C has a single-bounce path to device 14B; and IR signal 13D has a double-bounce path to device 14C. IR signals 13A, 13B and 13F may reach the same devices 14 or other devices (not shown) or may be absorbed by the environment and not be received by any device. Now, if intermediary device 12 transmitted with just the same IR power level as conventional IR remote control, then the likelihood of success of a usable signal at devices 14B and 14C would be minimal: after reflecting and/or scattering off of the surface of obstructions 16A, 16B and 18, the received IR signal would be below the threshold level of the devices 14B, 14C. In the preferred embodiment, however, the transmitted IR signal is several times greater than that typical IR power level, so the IR signal is more robust and a usable signal is still received at the devices 14B, 14C even after one reflection or two or more reflections. To achieve this power level, intermediary device 12 is preferably powered from the AC line.

FIGS. 1B-1E are illustrations of a preferred embodiment of an intermediary device 12 and show an optional IR receiver 20J, an optional visible LED indicator 20G, and a plurality of high-power IR LEDs 20K. The intermediary device 12 has a three-prong (three-pins) electrical plug 36 extending from the base so that the intermediary device 12 can be plugged into a standard wall outlet (not shown) for operating power. This embodiment has a low form factor, and can be loosely described as being part of a spheroid. In one embodiment, it is approximately ⅓ of a spheroid. Thus, it can be placed behind furniture or even mounted on the wall in plain view. Note that the use of numerous IR LEDs 20K, pointing in different directions, assures that the transmitted IR signal will emerge from behind, or reflect off, the furniture, be reflected off the walls, floor, and/or ceiling, and still reach the intended device 14 with adequate power to cause the device 14 to execute the desired command.

In the embodiment shown, the IR LEDs are arranged in two arcs which intersect at the top, which is also the point through which the longitudinal axis 27 of the intermediary device 12 extends in this embodiment. Note that the longitudinal axis 27 is perpendicular to the base of the intermediary device 12 in this embodiment. In one embodiment, the IR LEDs are evenly angularly spaced along the arcs. This means that, toward the midpoint of an arc, the IR LEDs will be more closely spaced in one direction, such as the direction parallel to the longitudinal axis, than in another direction, such as a direction orthogonal to the longitudinal axis. Correspondingly, the opposite will be true toward the end of an arc. Other spacing arrangements may also be used, as desired, such as, but not limited to, evenly-spaced linear distances of the IR LEDs with respect to the longitudinal axis, evenly-spaced linear distances of the IR LEDs with respect to the base, spacing based upon an algorithm, etc.

In one embodiment, the IR LEDs are positioned so that the emitted IR power is greater in one direction than in another direction. For example, in one embodiment, the emitted IR power is greater in an upward direction, toward the ceiling, than the emitted power toward the floor. In another embodiment, the emitted power directed laterally is greater than the emitted power directed forward. In another embodiment, the emitted power in the region greater than an angle of approximately 45 degrees from the longitudinal axis 27 is greater than the emitted power in the region less than an angle of approximately 45 degrees from the longitudinal axis 27. In another embodiment, the emitted power in the region greater than an angle of approximately 70 degrees from the longitudinal axis 27 is greater than the emitted power in the region less than an angle of approximately 70 degrees from the longitudinal axis 27. That is, the total IR power emitted by the IR LEDs whose optical axis is at an angle of greater than about 70 degrees with respect to the longitudinal axis is greater than the total IR power emitted by the IR LEDs whose optical axis is at an angle of less than about 70 degrees with respect to the longitudinal axis. In another embodiment, the greater IR power emitted is at least twice the lesser IR power emitted. In another embodiment, the greater IR power emitted is at least four times the lesser IR power emitted. It is preferable, although not required, that the lesser emitted power be non-zero so that voids in the IR coverage are not inadvertently created.

The intermediary device 12 can be considered to have four primary sections or components: the plug 36, a top portion 22, a base 24, and the electronics 26, discussed below.

The top portion 22 is IR-transparent, or at least has IR-transparent windows or holes whereby the IR LEDs can transmit effectively and any IR receiver can receive effectively. It should also be RF transparent (for example, not metal) in one area to allow the device 12 to receive RF transmissions from the remote control device 10. Preferably, it is visible-light transparent in one area to allow the user to conveniently view any desired visible-light indicators. As long as IR and RF transmission and any desired visible light transmission are provided for the top portion 22 may be any convenient or appropriate material, and may be visible-light transparent, visible-light opaque, colored, or styled as desired. Alternatively, if the top portion 22 is not transparent in a desired portion of the spectrum, then an antenna for the RF transmitter or receiver, the IR LEDs, and/or the visible light status indicator(s) may be mounted outside the top portion 22.

The base 24 should be strong enough not to crack or break under normal use (plugging the device into a wall socket and removing it from a wall socket, and preferably an occasional accidental drop). The base 24 has an indent 24A, which may be only at one part, such as the front, or at the sides, or at the front and sides, etc. This indent 24A is not critical to the operation of the intermediary device 12 but merely allows the user to easily grasp the device to unplug it from a socket.

Figure 2A:
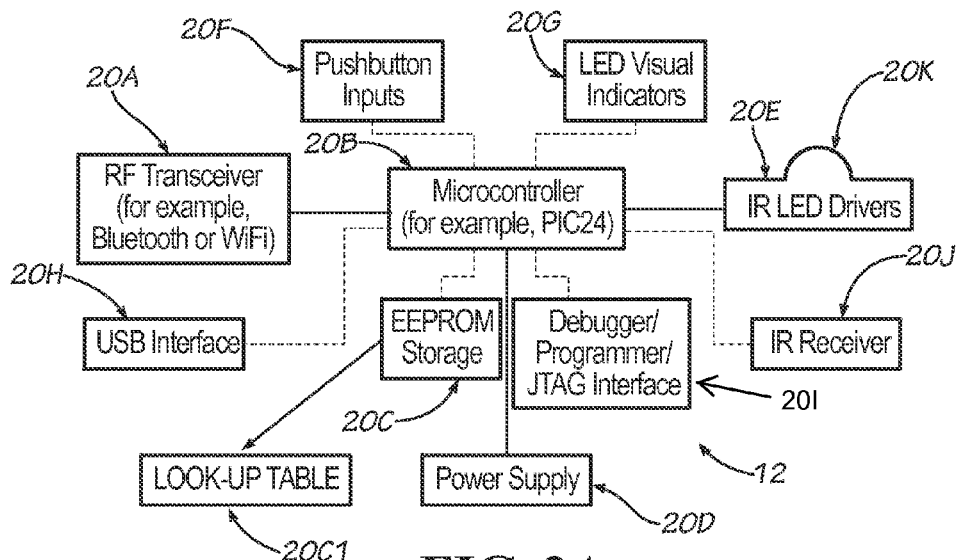
FIG. 2A is a representative schematic block diagram of an intermediary device.

FIG. 2A is a representative schematic block diagram of an intermediary device 12.

A minimum intermediary device 12 preferably has a power supply 20D, a processor 20B, an RF receiver (or transceiver) 20A to at least receive the RF signals from the remote control 10, IR LED drivers 20E, and IR LEDs 20K. Intermediary device 12 may also include a memory 20C, a visual indicator 20G and/or a user interface 20F. The user interface 20F may range from very simple to very complex, as desired. For example, a very simple user interface 20F might be a single pushbutton which, when pressed, resets or restarts the intermediary device 12. For example, a single press might turn the intermediary device 12 on or off; two quick presses might cause the intermediary device 12 to reset, and pressing and holding the button for several seconds might cause the intermediary device 12 to reset to the original factory parameters. A more complex user interface 20F might include numerous pushbuttons, switches, and/or data ports. The visual indicator 20G may also range from very simple to very complex, as desired. For example, a very simple visual indicator 20G might be a single visible LED which might simply glow to indicate that the power is on or may blink to indicate the activity or state of operation of the intermediary device 12. A more complex visual indicator 20G might include a plurality of visible LEDs and/or a display screen, which may be touch-sensitive to also function as the user interface 20F. The memory 20C in the intermediary device 12 may be an EEPROM or other nonvolatile memory storage device.

The intermediary device 12 might also have an optional IR receiver 20J so that it can "learn" the various IR command characteristics for a controlled device. The intermediary device 12 might also use a transceiver 20A, rather than just a transmitter, so as to send an acknowledgement signal to, or exchange information with, the remote control 10. The intermediary device 12 may also have a USB or other interface 20H for receiving user instructions and/or to program the memory 20C with the IR command characteristics for the devices to be controlled. The intermediary device 12 might also have a debugger/programmer/Joint Test Action Group (JTAG)/IEEE 1149.1 Standard Test Access Port interface 20I for programming, debugging, upgrading, and/or testing.

In operation, the intermediary device 12 receives a RF command signal from the remote control 10 and then broadcasts a corresponding high-power IR command signal using the high-power IR LEDs 20K.

In one embodiment, the memory 20C of the intermediary device 12 can be preprogrammed with the various signal characteristics of various devices 14 and the user instructs the intermediary device 12 as to the manufacturer and model of the device 14 by pressing certain buttons or icons on the user interface 20F on the intermediary device 12, and entering a designated number, such as from an accompanying brochure which lists various types of equipment, manufacturer, model, and a corresponding code, as discussed above with respect to the remote control 10. Alternatively, the user can so instruct the intermediary device 12 using the USB or other interface 20H or even the interface 20I.

In another embodiment, the intermediary device 12 may have a memory 20C which is pre-programmed with the IR signal characteristics, such as the various frequency and control codes, for a plurality of devices 14. In this case, the user specifies the manufacturer and type of device (TV, disc player, cable TV converter, etc.) by pressing certain buttons or icons on the user interface 20F or via an interface 20H or 20I, and entering a designated number, usually from a brochure listing the various types of equipment, manufacturer, model, and a corresponding code.

The memory 20C can include a lookup table 20C1 to determine the signal characteristics based upon the device information and the command.

Alternatively, if the intermediary device 12 has an IR receiver 20J then the user can cause the intermediary device 12 to "learn" the particular IR signal characteristics for the various devices 14. For example, the user places the original manufacturer's IR remote control against the IR receiver 20J in the intermediary device 12, indicates that the intermediary device 12 is to "Learn" a command, such as by pressing a "Learn" button on the intermediary device 12 or sending a "Learn" command to the intermediary device 12 via the interface 20H or 20I. The user then indicates "TV" and "Channel Up" to the intermediary device 12, and then presses the "Channel Up" button on the manufacturer's IR remote control. The intermediary device 12 receives the IR signal, demodulates it to determine the characteristics (e.g., the modulation frequency and control code) for that command for that device, and then stores it in the memory 20C. This method of the user programming of a device is well known for universal IR remote controls.

In another embodiment, the interface 20H can provide a connection to the Internet. In this case, the user can indicate that the intermediary device 12 should access the Internet to obtain the various commands and signal characteristics for a designated device, and then download and store those commands and signal characteristics. The user may instruct the intermediary device 12 as to the Internet address where the information is stored, or the intermediary device 12 can use a previously-stored Internet address, such as a factory-programmed default Internet address, to access and download that information.

In still another embodiment, the intermediary device 12 can automatically configure itself. In this embodiment the processor 20B will monitor the IR receiver 20J and the RF receiver 20A for received signals. If a signal is received, the processor 20B will send a message to the other device (not shown) requesting identification (for example, the type of device, the manufacturer, and the model number of the device which it controls), and the signal characteristics therefor. The intermediary device 12 will then store that information in the memory 20C for use in controlling the designated device 14. Alternatively, upon receiving at least some of the identification information, the intermediary device 12 will access the Internet to obtain the signal characteristics. Thus, the intermediary device 12 can auto-configure upon detecting a new remote control.

The intermediary device 12 also preferably automatically configures with respect to devices 14 which support two-way communications. For example, the intermediary device 12 may detect a broadcast from a device 14 and, in response, queries the device 14 to obtain information about the type, manufacturer, and model of the device and, if available, the commands and signal characteristics for that device 14. Alternatively, the intermediary device 12 may, at random or periodic intervals, or at pre-programmed times, or upon user command, transmit a "hello" command. If a device 14 replies, and information regarding that device is not in the database in the memory 20C of the intermediary device, then the intermediary device 12 will query the device 14 to obtain information about the type, manufacturer, and model of the device and, if available, the commands and signal characteristics for that device 14. If commands and signal characteristics for that device 14 are not available from that device 14 then the intermediary device 12 will search the Internet, as described herein, for that information.

In addition, the intermediary device 12 preferably, but not necessarily, keeps a record of which devices 14 are active and can choose which device 14 to send a common command. For example, if the user has a DVR, DVD player, and a VCR (for those legacy movies), all of these devices have stop, play, fast forward, and rewind commands. Thus, if the user presses the play button on the remote control 10, there preferably is a technique for indicating the intended device 14. Of course, the user could press a "DVR" button to indicate that the following command is for the DVR. Preferably, however, the intermediary device 12 keeps a log of which device 14 has been powered on and sends the command for that device. More preferably, however, the intermediary device 12 also keeps a log of which input (e.g., HDMI 1, HDMI 2, HDMI 3, antenna, cable, phono plug, etc.) has been selected for the active input for the TV. Thus, if the DVR is connected to input HDMI 1, and the DVD is connected to HDMI 2, and the TV input is set to HDMI 2 then, when the user presses the play button on the remote control 10, the intermediary device 12 knows that the DVD 14 is the active connected device, and configures the play command for it to be transmitted to the DVD. The intermediary device 12 can also, or instead, keep track of the last device to which a particular command was sent. Thus, in the above example, if the user has selected the DVR and pressed the play button then, when the user presses the rewind button, the intermediary device 12 will recall that the last command was for the DVR and so configures the rewind command for it to be transmitted to the DVD 14.

Other possible embodiments of the intermediary device 12 include visible LED indicators 20G so that the user can verify or test the operation of the intermediary device, a USB port (or other wired interface port) to provide for testing the intermediary device 12, sending control frequency and code information regarding the various devices 14 for storage in the memory 20C and/or to provide for the user to send instructions from a connected device, such as a laptop 10, to the controlled device 14, and a debugger/programmer/Joint Test Action Group (JTAG)/IEEE 1149.1 Standard Test Access Port interface 20I for programming, debugging, upgrading, and/or testing the intermediary device 12.

In one embodiment, the RF transceiver 20A of the intermediary device 12 receives a command RF signal from the remote control 10 and converts (demodulates) it to a digital signal which is provided to the processor 20B of the intermediary device 12. The processor then generates a device-specific command signal (or signals in the case where multiple devices 14 are to be simultaneously controlled, such as the power off command) which is provided to the IR LED drivers 20E of the intermediary device 12. The drivers 20E cause the IR LEDs 20K to generate a modulated IR signal which is then received by the controlled device(s) 14. A power supply 20D powers the processor and the other circuitry in the intermediary device 12. The RF signal may be, for example, but is not limited to, Bluetooth, Wi-Fi, ZigBee, WiMax, and WiMedia signals. After receiving an RF signal from the remote control 10 the intermediary device 12 may send an acknowledgement signal to the remote control 10 via the transceiver 20A. Alternatively, the transceiver 20A in the intermediary device 12 may just be a receiver if two-way communications with the remote control 10 are not required.

In another embodiment, the RF signal sent by the remote control 10 is modulated with the IR signal characteristics, such as the modulation frequency and control codes, such that, except for the RF—IR transmission distinction, the RF signal sent by the remote control 10 is identical to the IR signal that would be sent by the remote control made by the manufacturer for the controlled device 14. Thus, the processor 20B in the intermediary device 12 merely passes the information from the RF receiver 20A to the IR drivers 20E. More particularly, the processor 20B generates a device-specific command signal (or signals in the case where multiple devices 14 are to be simultaneously controlled, such as the power off command) which is then provided to the IR LED drivers 20E of the intermediary device 12 which, in turn, drive the high-power IR LEDs 20K.

In these various embodiments, an RF signal sent by the remote control 10 thus causes the intermediary device 12 to emit a high-power IR control signal 13 with the characteristics necessary to control the designated device 14.

Although the intermediary device 12 preferably uses a single power supply to power all of the components therein, one could use two or more power supplies so as to separately power one or more of the components therein. For example, one power supply could be used to power processor 20B and RF receiver (or transceiver) 20A, and another power supply used to power the IR LED drivers 20E and IR LEDs 20K.

With respect to a remote control device 10, a minimum remote control device 10 might have only a battery for the power supply 20D, a user interface 20F, a processor 20B, a memory 20C which allows the processor to convert the user inputs from the user interface 20F into corresponding command signals, and an RF transmitter 20A to transmit the RF command signals. As in the case of the intermediary device 12, the user interface 20F may range from very simple to very complex, as desired. For example, a very simple user interface 20F might be a plurality of pushbuttons to indicate, for example, channel up, channel down, volume up, volume down, play, rewind, pause, stop, fast forward, record, a device designation, power on/off, etc. There might also be a pushbutton, preferably but not necessarily recessed or located so as to prevent accidental activation, which, when pressed, resets or restarts the remote control device 10. The visual indicator 20G may also range from very simple to very complex, as desired. For example, a very simple visual indicator 20G might be a single visible LED which might simply blink to indicate the activity or state of operation of the remote control device 10. A more complex visual indicator 20G might include a plurality of visible LEDs and/or a display screen, which may be touch-sensitive to also function as the user interface 20F. The memory 20C in the remote control device 10 may be an EEPROM or other nonvolatile memory storage device.

One form of a complex remote control device 10 is a "smart" platform, including for example, but not limited to, smartphones, game controllers, iPhone, iPad, iPod Touch manufactured by Apple Inc., BlackBerrys manufactured by Research In Motion Limited, laptops, desktops or any other device having wireless capabilities or connected through a wired network or even an IR network.

The remote control 10 might also have an optional IR receiver 20J so that it can "learn" the various IR command characteristics for a controlled device in the same manner as described above for the intermediary device 12. The remote control 10 might also use a transceiver 20A, rather than just a transmitter, so as to receive an acknowledgement signal or other information from the intermediary device 12.

The remote control 10 may also have a USB or other interface 20H for receiving user instructions and/or to program the memory 20C with the IR command characteristics for the devices to be controlled. The remote control 10 might also have an IR transmitter 20E in addition to the RF transmitter 20A so that the remote control 10 broadcasts both RF and IR command signals. The remote control 10 might also have a debugger/programmer/Joint Test Action Group (JTAG)/IEEE 1149.1 Standard Test Access Port interface 20I for programming, debugging, upgrading, and/or testing.

As mentioned above, in one embodiment, the RF signal sent by the remote control 10 is modulated or encoded with the IR signal characteristics, such as the modulation frequency and control codes, such that, except for the RF—IR transmission distinction, the RF signal sent by the remote control 10 is identical to the IR signal that would be sent by the remote control made by the manufacturer for the controlled device 14. Thus, the processor 20B in the intermediary device 12 merely passes the information from the RF receiver to the IR drivers. More particularly, the processor 20B generates a device-specific command signal (or signals in the case where multiple devices 14 are to be simultaneously controlled, such as the power off command) which is then provided to the IR LED drivers 20E of the intermediary device 12 which, in turn, drive the high-power IR LEDs 20K.

The memory 20C of the remote control 10 may be preprogrammed with the IR signal characteristics, such as the various frequency and control codes, for a plurality of devices 14. In this case, the user specifies the manufacturer and type of device (TV, disc player, cable TV converter, etc.) by pressing certain buttons or icons on the user interface 20F on the remote control 10, and entering a designated number, usually from a brochure listing the various types of equipment, manufacturer, model, and a corresponding code. This method of the user programming of a remote control is well known for universal IR remote controls.

The remote control 10 may also have an IR receiver 20J. In this case the user can cause the remote control 10 to "learn" the particular IR signal characteristics for the various devices 14 in a manner similar to that described with respect to the intermediary device 12.

In still another embodiment, the remote control 10 does not use the manufacturers' signal characteristics but, rather, the processor 20B in the remote control 10 consults the look-up table 20C1 and generates an RF signal which is modulated to identify a command, such as "Volume Up", and the device for which the command is intended, such as "TV", or "disc player", or "all", etc. The RF signal is received and demodulated by the receiver 20A in the intermediary device 12, and the processor 20B in the intermediary device 12 then consults a look-up table 20C1 in a memory 20C to determine the signal characteristics for "Volume Up" for the particular device 14, generates the appropriate device-specific command signal, and then sends that signal to the drivers 20E, which then cause the various IR LEDs 20K to transmit the modulated IR signals 13 for reception by the intended device 14.

The intermediary device 12 communicates with the devices 14 using the IR signal characteristics, commands, protocol, etc., that the devices 14 accommodate. In addition, the intermediary device 12 can communicate with the various complex controllers 10 mentioned above, using the RF communications described herein. To that end, the intermediary device 12 preferably accommodates most commonly-used RF protocols including, by way of example and not of limitation, the IEEE 802.11, 802.15.4, or 802.16 protocol. Other protocols can, of course, be used, as desired or as necessary for a particular use or installation.

Figure 2B:
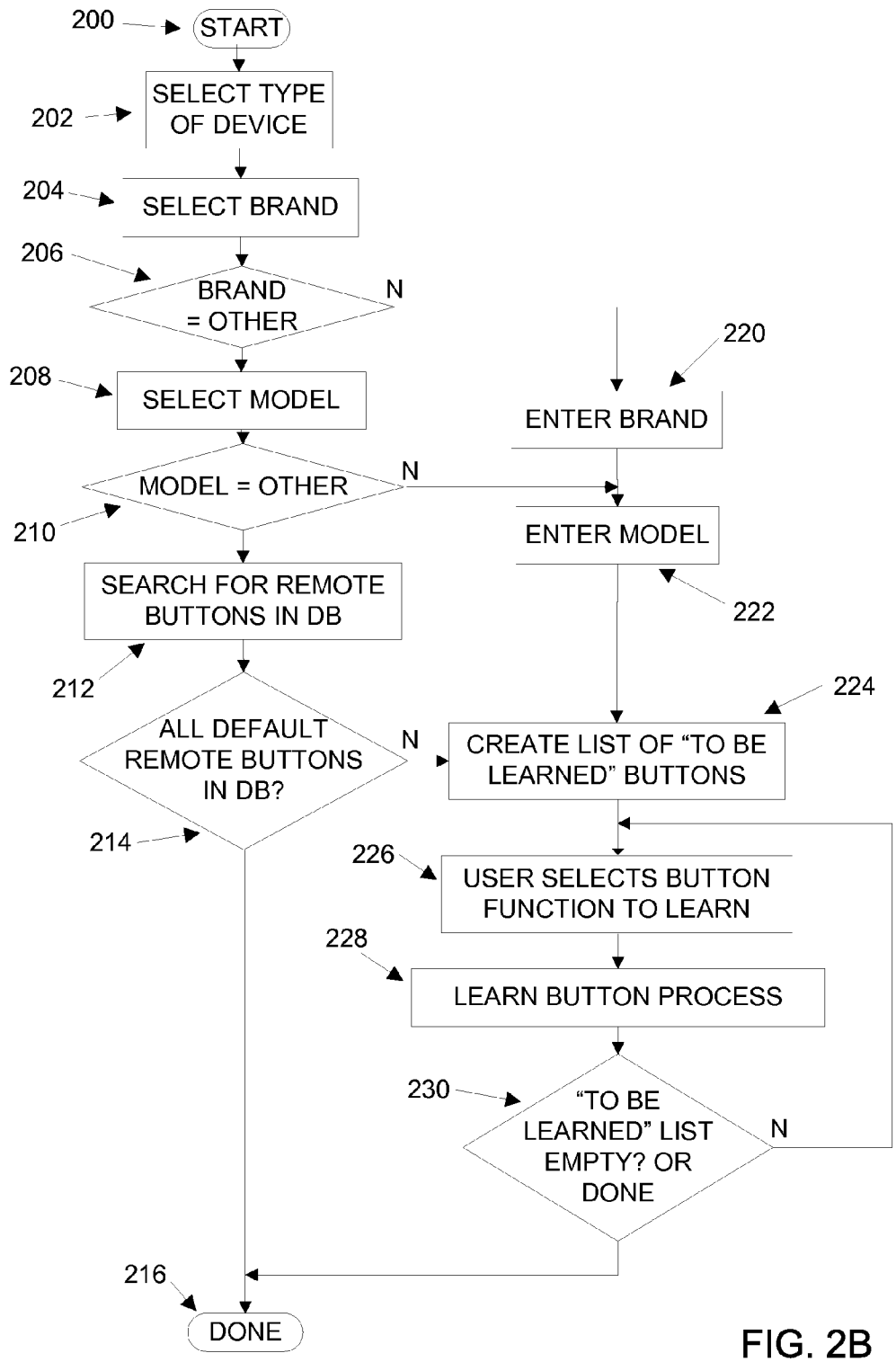
FIG. 2B is a flow chart of an exemplary user programming process for an intermediary device.

FIG. 2B is a flow chart of an exemplary user programming process for an intermediary device 12. Upon starting 200 the user programming mode, the user selection 202 of the device type (TV, DVR, etc.) and the user selection 204 of the brand (manufacturer) are received. The intermediary device 12 then determines 206 whether that brand of that device is in the database in the memory 20C. If so then the user selection 208 of the model is received. The intermediary device 12 then determines 210 whether that model is in the database in the memory 20C. If so, the intermediary device 12 then searches 212 the database in the memory 20C to identify 212 the remote control buttons corresponding to the commands for that model. The intermediary device 12 then determines 214 whether all of the default remote control buttons are in the database. If so, then the user programming process for that model for that brand of device is complete 216.

If, at decision 206, the brand is not in the database then the intermediary device 12 receives 220 the user specification of the brand of the device and stores that in the database in the memory 20C. The intermediary device 12 then receives 222 the user specification of the model of the device and stores that in the database.

The intermediary device 12 then creates 224 a list of "to be learned" buttons. The intermediary device 12 then receives 226 the user selection of the button and function to be learned. The intermediary device 12 then performs 228 the "LEARN" button process for that button. This is the "LEARN" process described above. Once the process 228 is complete the intermediary device 12 inspects 230 the list of "to be learned" buttons to determine if all of the "to be learned" buttons have been programmed. If not, then the intermediary device 12 returns to step 226. If all of the "to be learned" buttons have been programmed then the user programming process for that model for that brand of device is complete 216.

If, at decision 210, that model is not in the database in the memory 20C then the intermediary device 12 proceeds to step 222.

If, at decision 214, all of the default remote control buttons are not in the database then the intermediary device 12 proceeds to step 224.

The user programming of the intermediary device 12 may be performed via pushbuttons, icons, etc. via the user interface 20F, may be performed using, for example, a laptop or other computing device connected via the interface 20H or 20I, or may be performed using the remote control device 10 if the remote control device 10 is a "smart" device, as mentioned above, and has software and hardware (RF transceiver) appropriate to allow the user to communicate with and control the intermediary device 12 using the device 10.

If the brand and model are in the database of the intermediary device 12, or can be obtained by the intermediary device 12 (such as via an Internet connection to a remote master database) then the list of "to be learned" buttons is retrieved from the database.

If, however, the brand or model are not in the database of the intermediary device 12 and cannot be obtained by the intermediary device 12 then the list of "to be learned" buttons is generated based upon the device type selection of step 202 and the buttons that are present on the remote control 10. For example, if the device type is DVD players, the database would indicate that standard DVD player buttons need to be programmed, such as stop, pause, play, rewind, fast forward, eject, etc. Other buttons would not need to be learned for that device, however, such as channel up, channel down, source, etc. The intermediary device 12 has a list of the buttons on the remote control 10 based upon the information, such as model number, sent from the remote control 10. For example, a low-cost model of remote control 10 might be intended for use with only a television, DVD player, and CATV converter box. Another model of remote control might be for use with those devices as well as a DVR box, audio amplifier, home theater room controls, etc.

Figure 3:
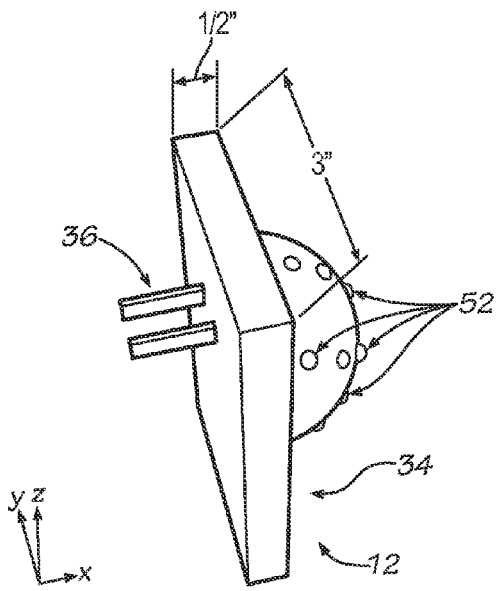
FIGS. 3 and 4 illustrate perspective views of an embodiment of an intermediary device having a hemispherical surface and a base.
Figure 4:
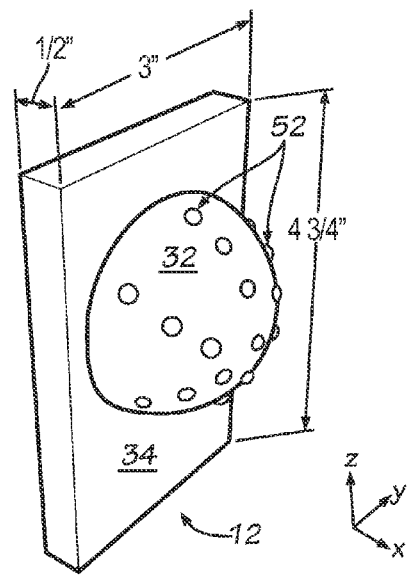

FIGS. 3 and 4 illustrate perspective views of an embodiment of an intermediary device 12 having a hemispherical surface 32 and a base 34. The intermediary device 12 has a two-prong (two-pin) electrical plug 36 extending from the base so that the intermediary device 12 can be plugged into a standard wall outlet (not shown) for operating power. These figures also show an exemplary plurality of high-power IR LEDs 52 arranged on the hemispherical surface.

Figure 5A:
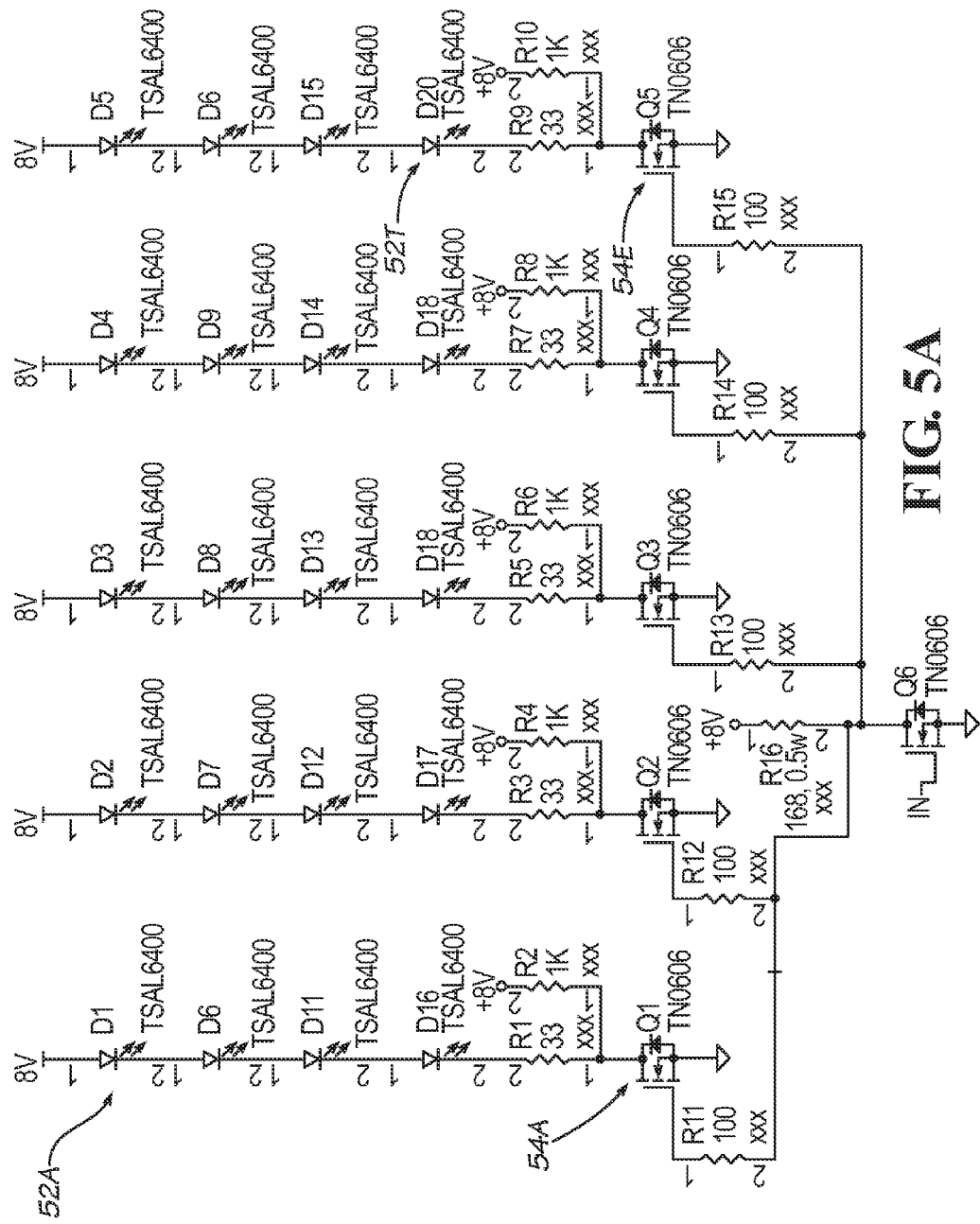
FIGS. 5A and 5B are electrical schematic diagrams of a portion of the electrical system of an exemplary intermediary device showing a plurality of IR LEDs and drivers.
Figure 5B:
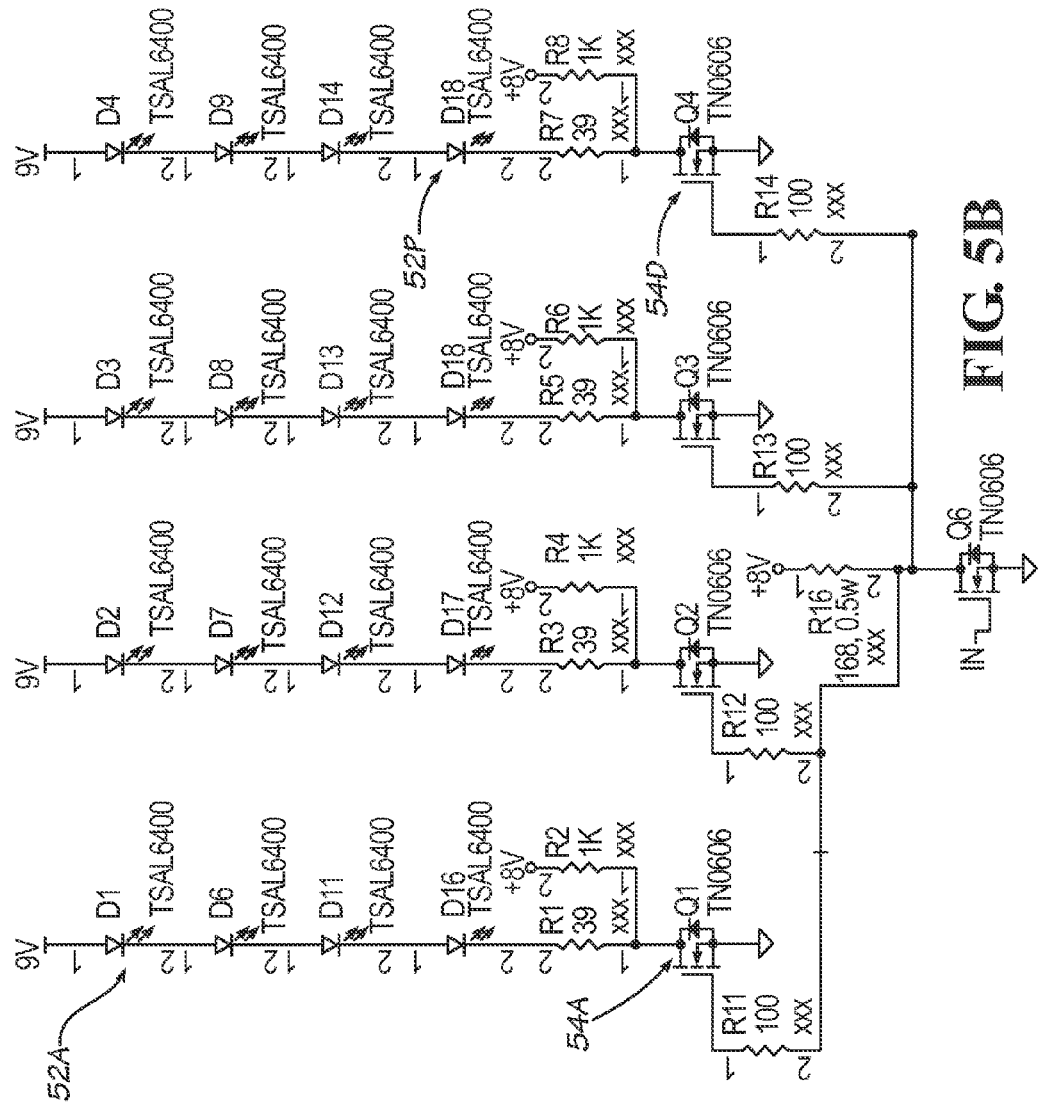

FIGS. 5A and 5B are electrical schematic diagrams of a portion of the electrical system of an exemplary intermediary device 12 showing a plurality of high-power IR LEDs 52 and drivers 54. FIG. 5A shows an exemplary embodiment having 20 LEDs 52A-52T arranged in series strings of 4 LEDs, there being 5 strings of LEDs in parallel, each string being driven by a corresponding driver 54A-54E. FIG. 5B shows an exemplary embodiment having 16 LEDs 52A-52P arranged in series strings of 4 LEDs, there being 4 strings of LEDs in parallel, each string being driven by a corresponding driver 54A-54D. As another example, turning to FIGS. 1B-1E, one or more strings of IR LEDs 20K which are disposed along an arc may be serially connected, and/or one or more strings disposed along the respective two arcs may be in parallel. Other series-parallel string arrangements may be used, depending upon the supply voltage, the total output power level desired, the angular coverage desired, desired redundancy, desired level of selection of individual LEDs or strings of LEDs, etc.

A typical IR LED in a standard IR remote control has an output power level of approximately 10 to 20 milliwatts. As used herein, the term "high-power" IR LED means that the IR LED preferably has a maximum IR output power level of at least 40 milliwatts, more preferably, 50 milliwatts, more preferably, 100 milliwatts, more preferably 200 milliwatts, more preferably, 300 milliwatts, more preferably, 400 milliwatts, more preferably 500 milliwatts, more preferably, 600 milliwatts, and even more preferably, over 600 milliwatts. The LEDs are preferably TSAL6400 high power IR LEDs or VSML3710 surface mount high power IR LEDs, manufactured by Vishay Intertechnology, Inc., Malvern, Pa. These IR LEDs have a nominal wavelength of 940 nanometers and an emitted power of 40 milliwatts/steradian. The TSAL6400 has and a half-intensity angle of ±25 degrees, and the VSML3710 has a half-intensity angle of ±60 degrees. These are preferences and are not limitations, as other, equivalent IR LEDs may be used if desired. Also, if desired, a lens may be used to achieve a desired half intensity angle. Preferably, an IR LED has a half-intensity angle of at least ±25 degrees. In addition, LEDs having different emitted power levels and/or beamwidths may also be used. Too low an emitted power level or too broad a beamwidth for the particular emitted power level may require an increased number of LEDs to achieve the desired coverage. Higher power levels, however, may increase the heat generation and/or the cost. Furthermore, a narrow beamwidth may require an increased number of LEDs to achieve the desired coverage. Thus, the size and shape of the anticipated room in which the system is to be used, and the number, size and nature of furniture or other obstructions in the room, and the reliability of remote control operation, are factors to be considered in determining the number of LEDs, their emitted power ratings, and their beamwidths.

Thus, one model of intermediary device 12 may be particularly configured for use with in-home movie theater rooms, and another model may be particularly configured for use in a small apartment, where the distances are not great, but more obstructions 16 are present, and the controlled devices 14 are more widely dispersed.

In another embodiment, the intermediary device 12 may have several different preprogrammed IR light dispersion configurations and the user can select the configuration that provides the best results. Some dispersion configurations might be, by way of example and not of limitation: primarily in two directions; primarily in three directions; primarily in two planes; primarily in three planes; omnidirectional; mostly radially or to the side; etc.

The user selection of the IR light dispersion configuration may be in any desired and convenient manner. For example, the user could press a "program" button on the remote control 10 or the intermediary device 12 and select a "pattern" button or icon. The intermediary device 12 would then broadcast IR control signals, such as PowerOn or PowerOff to several different devices. If proper control was present, the user might select that pattern. If proper control was not present, the user might select another pattern. If proper control was then present, the user might select that pattern. If proper control was still not present the user might select another pattern, etc.

Alternatively, an instruction manual could list pattern numbers for several different patterns and the user would simply look at the room patterns and pick the pattern number closest to that of his room, select that pattern and try to control the devices 14. If proper control was then present, the user would save that pattern designation into the intermediary device 12. If proper control was not present the user might select another pattern, and so on. Thus, even if the room is rearranged and/or new furniture brought in, the user can still select an IR light dispersion pattern which gives the desired results.

Preferably, but not necessarily, there is a default pattern.

In one embodiment, the IR LED driver 54 is a power MOSFET switch such as a DMOS field effect transistor, such as, but not limited to, the DMOS FET suitable for use in one embodiment is the TN0606 DMOS FET manufactured by Supertex Inc.

In one embodiment, an IR LED 20K is used for both transmitting an IR signal and also used as the IR receiver 20J. U.S. Pat. No. 7,072,587 discloses the use of LEDs to both emit and detect light.

FIGS. 6 and 7 illustrate perspective view of an embodiment of an intermediary device 12 in the shape of a truncated polyhedron. A two-prong plug 36, base 34, LEDs 52, and truncated surface 38 are shown.

Figure 8:
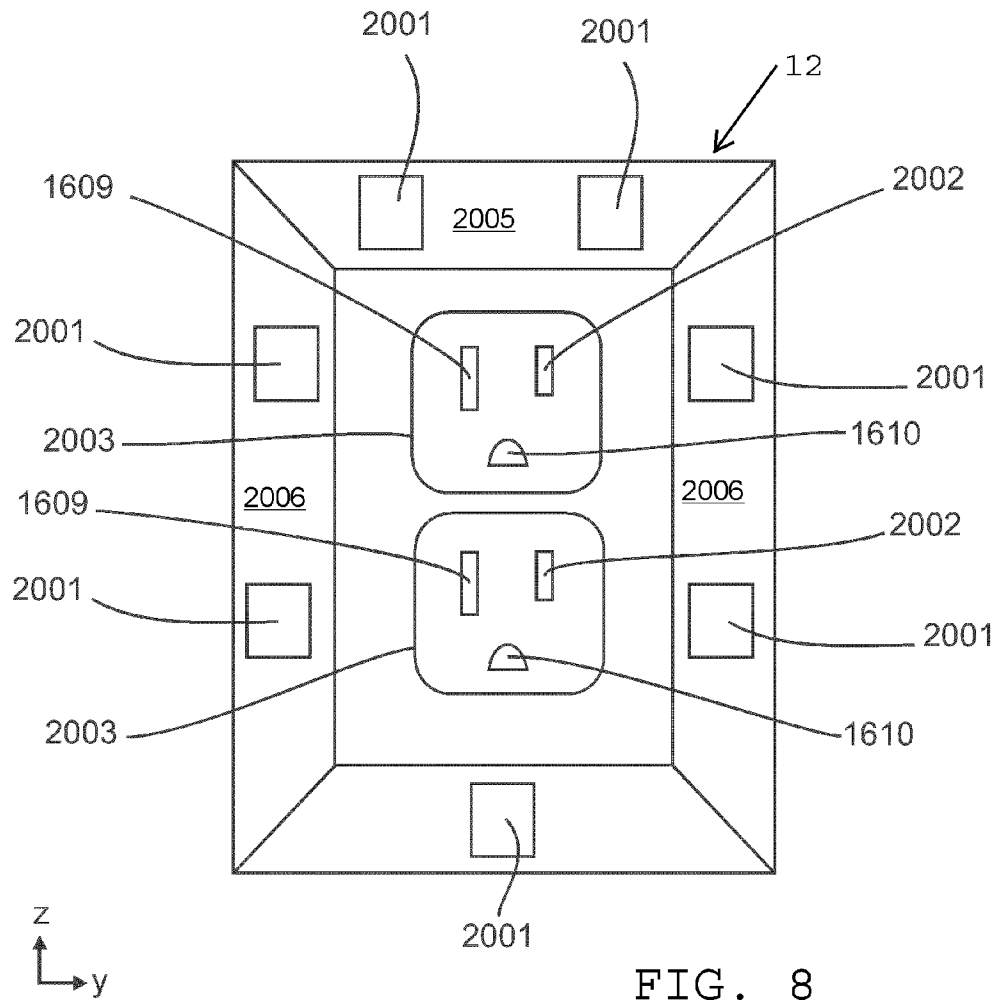
FIG. 8 illustrates a view of an intermediary device with power outlets.

FIG. 8 illustrates a view of an intermediary device 12 with power outlets 2003 having sockets 1609, 1610, 2002. Various LEDs 2001 pointing outward and forward are shown. If desired, however, one or more of the LEDs may point rearward so that IR light is reflected by the wall (18 in FIG. 1, 1706 in FIG. 17) behind the intermediary device 12. Also, if desired, the downwardly pointing LED 2001D may be eliminated, and/or more LEDs may be used on the angled top surface 2005 or the angled side surfaces 2006.

This intermediary device is similar to the intermediary device of FIGS. 6 and 7 but, when plugged into a wall receptacle, provides power outlets so that other devices can be plugged in to receive electrical power. Thus, the wall receptacle does not have to be dedicated to powering only the intermediary device 12.

In another embodiment, the intermediary device 12 is mounted directly in an electrical junction box rather than being plugged into a wall receptacle.

In still another embodiment, the intermediary device 12 may be used to control power to a device which is powered by a receptacle 2003. Thus, the remote control 10 may be used to control an auxiliary device, such as but not limited to a lamp. In this embodiment the intermediary device 12 would also have an auxiliary device control component (not shown), such as a relay or a TRIAC, connected to the processor 20B and situated between the receptacle 2003 and the AC power input connected to the power supply 20D. The processor 20B can then interpret the received RF signal to turn the auxiliary device on or off or, in the case of an incandescent lamp, to brighten or to dim the device.

Figure 9:
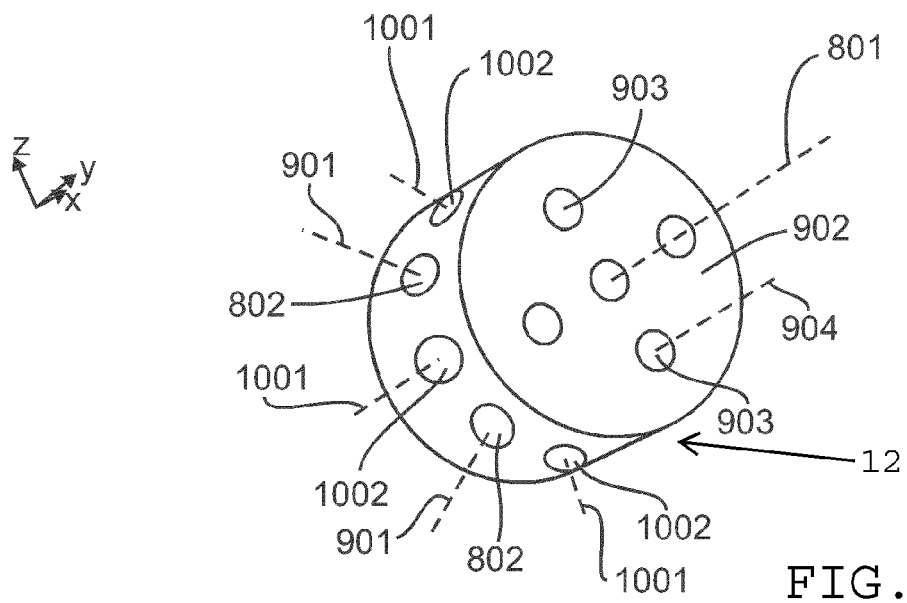
FIGS. 9 and 10 illustrate views of embodiments of an intermediary device in the shape of a short cylinder with some IR LEDs pointing rearward.
Figure 10:
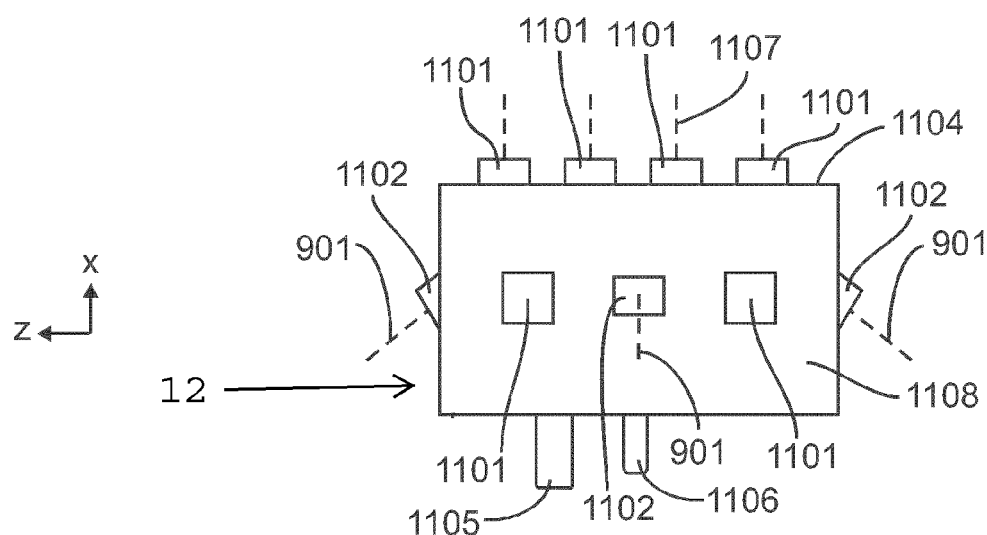

FIGS. 9 and 10 illustrate views of embodiments of an intermediary device 12 in the shape of a short cylinder with some LEDs pointing rearward. In FIG. 9, some of the LEDs, such as LEDs 802, 903, have their respective axis of radiation 901, 904, directed perpendicularly outward from the center axis 801 and the surface 902, respectively, of the cylinder. Other LEDs, such as LEDs 1002, have their axis of radiation 1001 directed rearward, that is, in the negative x (−x) direction. If such an intermediary device 12 is plugged into a wall outlet then the IR radiation from some of the LEDs 1002 will be directed toward the wall, where it can be reflected upward and/or outward, thus increasing the likelihood that some of the IR signal will successfully reach the intended device(s) 14 to be controlled.

Similarly, in FIG. 10, some LEDs 1101 have their axis 1107 of radiation directed perpendicularly outward from the surface 1104, other LEDs 1101 have their axis of radiation perpendicularly outward from the surface 1108, while still other LEDs 1102 have their axis 901 of radiation directed rearward.

In alternative embodiments, the axis of radiation of one or more of LEDs 802, 903 and/or 1101 are not directly perpendicular or outward with respect to the surface 902, 1104 and/or 1108 and/or center axis 801 but, instead, are at an angle with respect thereto. For example, the axis 904, 1107 of one or more of LEDs 903 or 1101 may diverge from axis 904, and/or one or more of LEDs 802, 1101 may point forward, that is, in the positive x (+x) direction. Power prongs 1105 and 1106 are also shown for reference.

Figure 11:
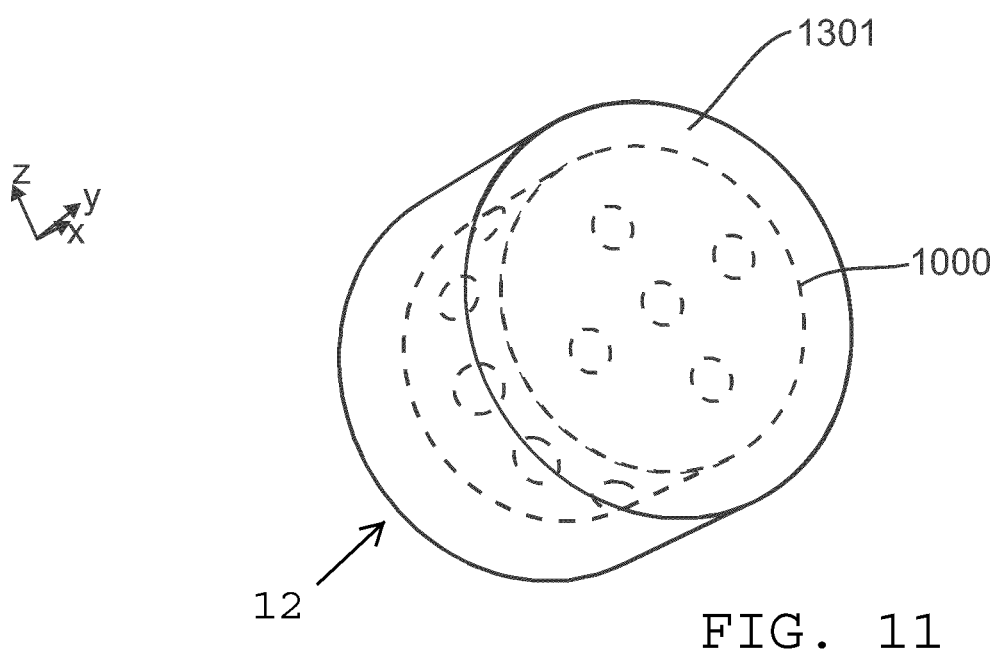
FIG. 11 illustrates a perspective view of an embodiment of an intermediary device in the shape of a cylinder with a visible-light absorbing cover.

FIG. 11 illustrates a perspective view of an embodiment of an intermediary device 12 in the shape of a cylinder 1000 with a visible-light absorbing cover 1301. This embodiment is particularly useful when, for esthetic purposes, it is desired that the LEDs be hidden. A visible-light absorbing, IR-transparent cover may also be used, if desired, with other configurations of the intermediary device 12.

Figure 12:
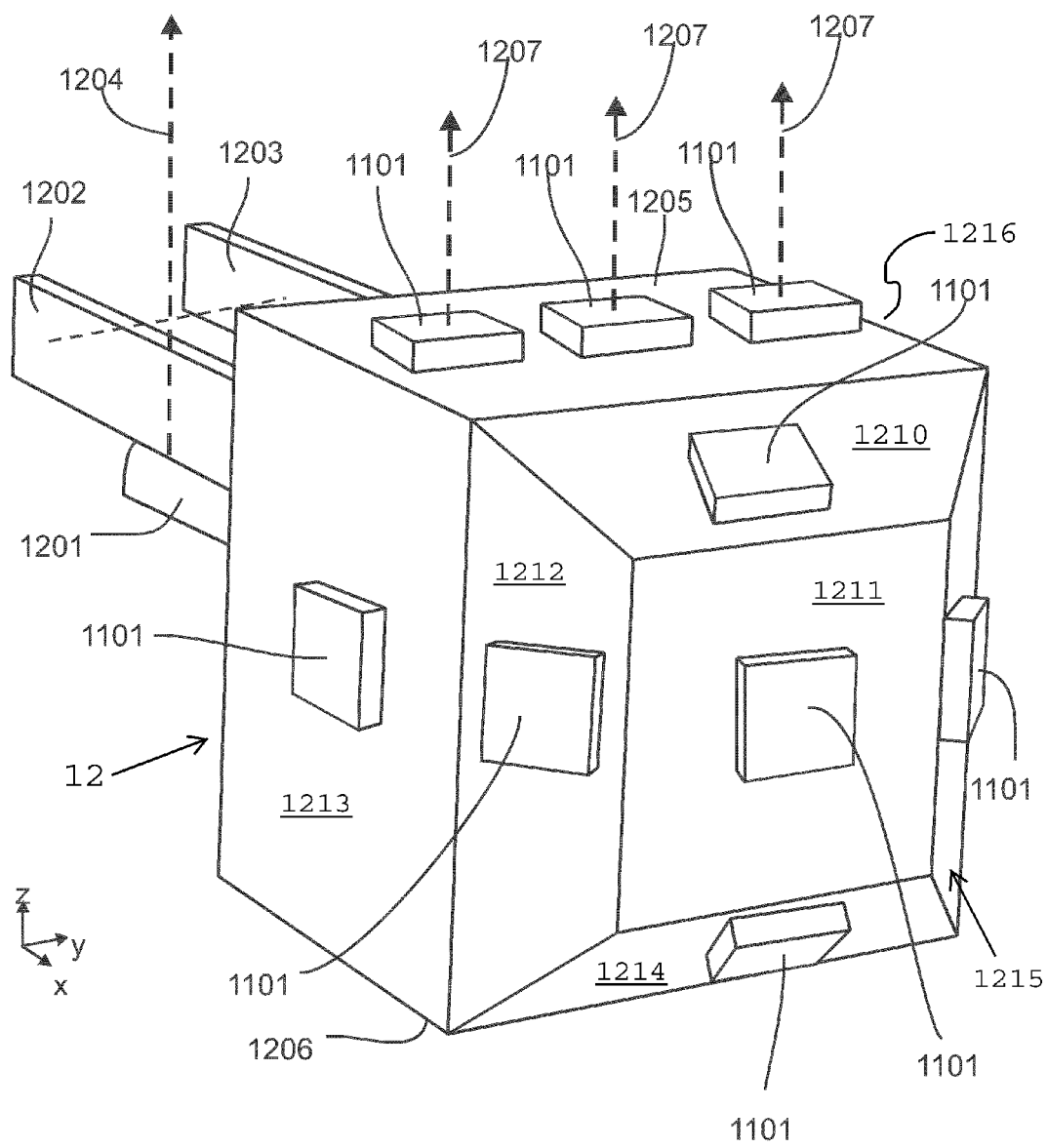
FIG. 12 illustrates a perspective view of an embodiment of an intermediary device with more IR LEDs directed upwardly than downwardly.

FIG. 12 illustrates a perspective view of an embodiment of an intermediary device 12 with more LEDs directed upwardly than downwardly. The three power prongs 1201, 1202, 1203 are shown along with the direction 1204 of orientation of prong 1202. Some of the LEDs 1101 are on the top surface 1205 with their axes 1207 directed upward (parallel to the +z direction and the direction 1204); other LEDs 1101 are on the front, side, and angled surfaces 1210, 1211, 1212, 1213, 1214, 1215 and 1216; and one LED (not shown) on the bottom surface 1206 directed downward.

If desired, there might not be an LED directed downward and, in this embodiment, very little of the IR power would be directed toward the floor, most of it being directed upward and/or outward. This embodiment may be preferred when, for example, the floor is covered with a material which tends to absorb the IR radiation, such as carpet.

Figure 13:
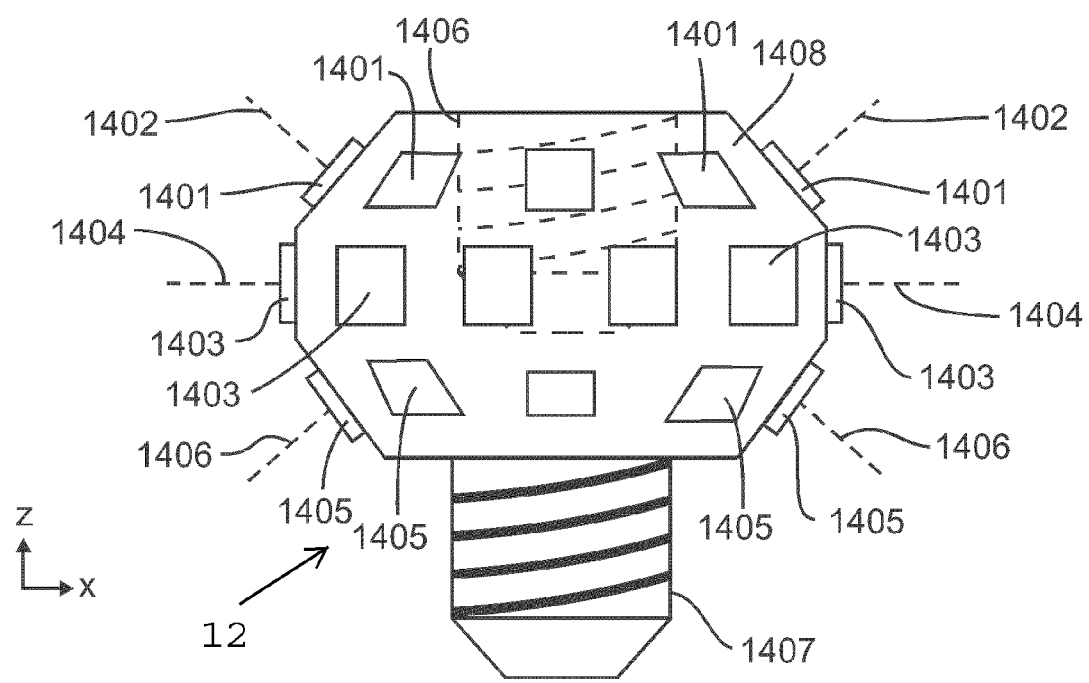
FIG. 13 illustrates a side view of an embodiment of an intermediary device in the shape of a globe with an Edison type E26 screw plug.

FIG. 13 illustrates a side view of an embodiment of an intermediary device 12 in the shape of a globe with an Edison type E26 screw plug 1407. Various LEDs 1401, 1403, 1405 are mounted on the outer surface 1408 and their respective axes 1402, 1404, 1406 point generally or perpendicularly away from the center axis of the device. This embodiment is particularly useful when it is desired to power the intermediary device 12 from a standard screw socket.

In another embodiment, the intermediary device 12 also has a Edison type E26 socket 1406 so that a light bulb or other device can be screwed into it an a screw socket does not have to be dedicated to powering only the intermediary device 12.

Figure 14:
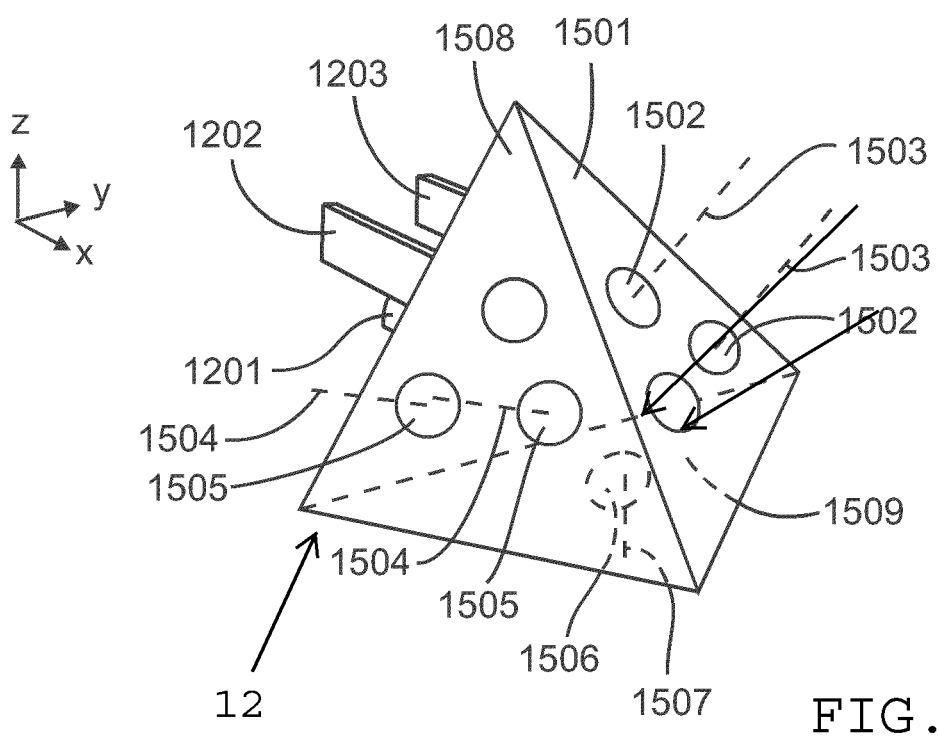
FIG. 14 illustrates a perspective view of an embodiment of an intermediary device which is substantially in the shape of a pyramid.

In still another embodiment, the intermediary device 12 may be used to turn power on or off to a device, such as but not limited to a light bulb, which is powered by socket 1406. Thus, the remote control 10 may also be used to control room lighting. For example, if the intermediary device 12 is screwed into a standard ceiling screw socket, the ceiling light bulb may then be screwed into the socket 1406. In this case the wall switch (not shown) may be left in the "on" position, and the remote control 12 used to turn the light on or off FIG. 14 illustrates a perspective view of an embodiment of an intermediary device which is substantially in the shape of a pyramid. Various LEDs 1502, 1505, 1506 are shown mounted on surfaces 1501, 1508 and 1509, along with their respective optical axes 1503, 1504, 1507. In this embodiment, more of the IR light is directed upwardly, forwardly, and outwardly than is directed downwardly. Power prongs 1201, 1202 and 1203 are also shown for reference.

There also may be no LED 1506 directed downward and, in this embodiment, very little of the IR power is directed toward the floor, most of it is directed upward and/or outward. This embodiment may be preferred when, for example, the floor is covered with a material which tends to absorb the IR radiation, such as carpet.

Figure 15:
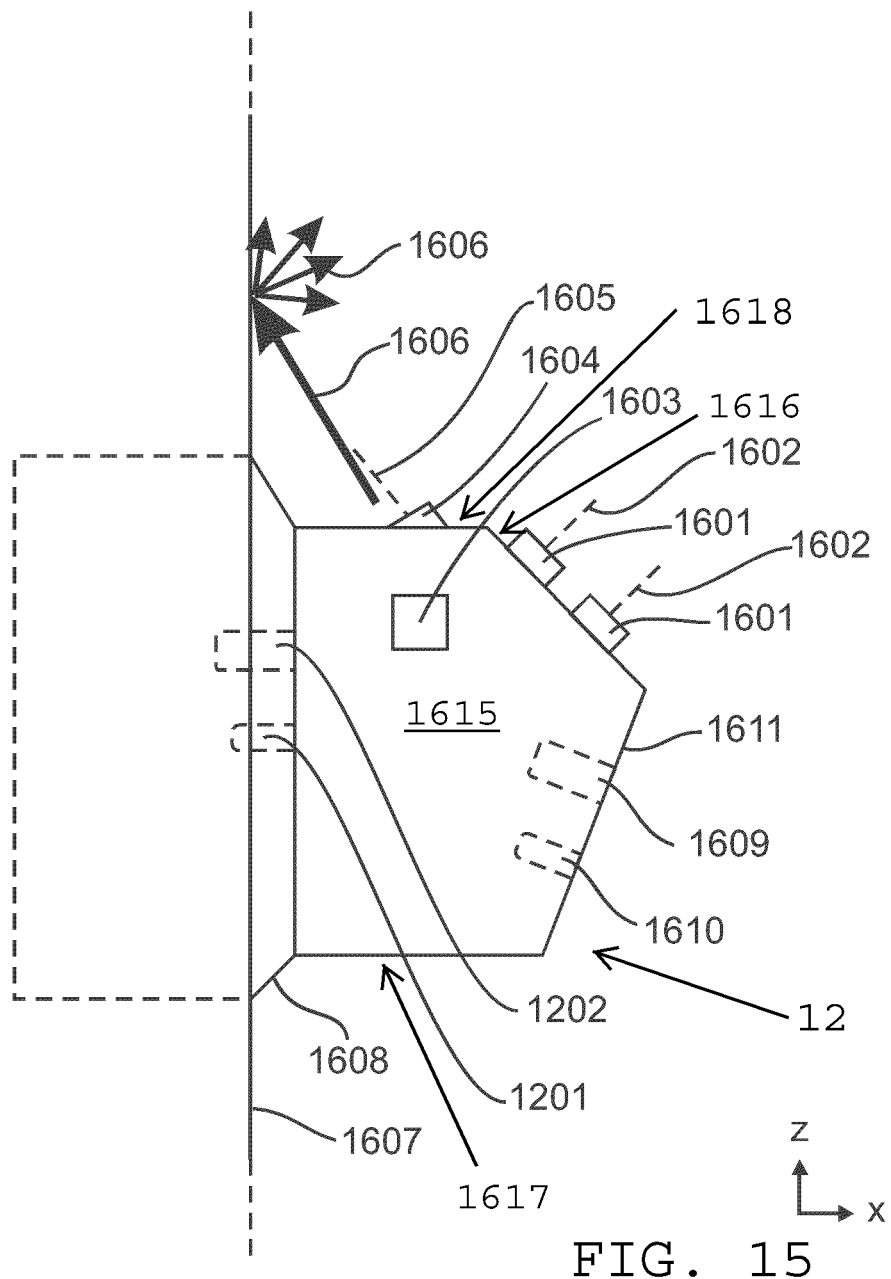
FIG. 15 illustrates a side view of an embodiment of an intermediary device with power outlets and with some LEDs pointing rearward.

FIG. 15 illustrates a side view of an embodiment 1615 of an intermediary device 12 with some LEDs 1604 pointing rearward. LED 1603 points outwardly from one side, LEDs 1601 have their axes 1602 pointed upward and forward from slanted surface 1616, and LED 1604 has its axis 1605 directed upward and rearward from surface 1618, so that the emitted IR light 1606 is reflected off of wall 1607. In this embodiment there are no LEDs on the bottom surface 1617, although there could be. The intermediary device 12 is shown plugged into a standard NEMA 5-15 wall receptacle 1608; prongs 1201 and 1202 are also shown.

In another embodiment, the intermediary device 12 also has a standard NEMA 5-15 receptacle as part of its surface 1611 so that a desired device can be plugged into it, and so that the wall receptacle does not have to be dedicated to powering only the intermediary device 12. Sockets 1609, 1610 are also shown.

In still another embodiment, the intermediary device 12 may be used to turn power on or off to a device which is powered by receptacle 1611, as described above.

Figure 16:
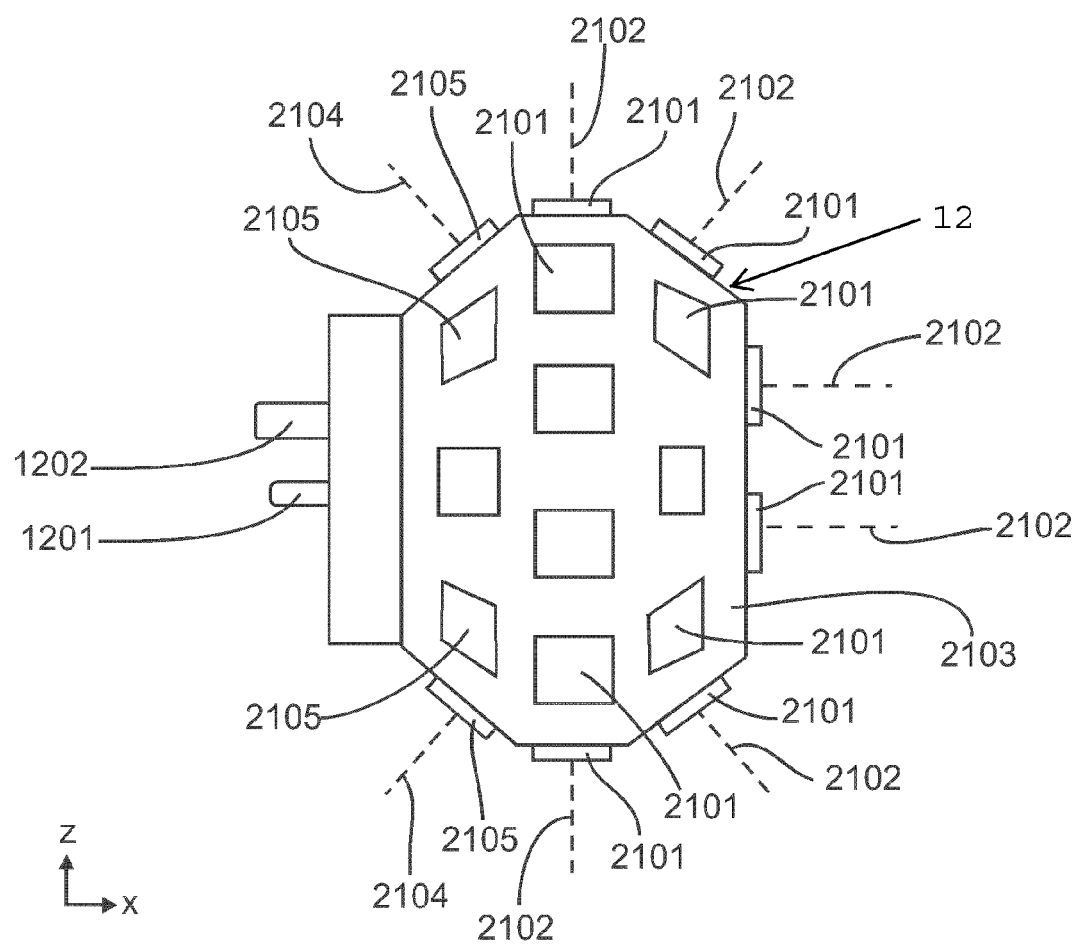
FIG. 16 illustrates a view of another intermediary device in the shape of a globe.

FIG. 16 illustrates a view of an intermediary device 12 in the shape of a globe. This embodiment is similar to that of FIG. 13, but has a NEMA 5-15 plug (prongs 1201 and 1202 are shown). There are a plurality of LEDs 2101, 2105, having a respective plurality of axes 2102, 2104, mounted on the surface 2103. Some LEDs point directly forward, some point generally forward, some point radially outward, and some point generally rearward.

Although the intermediary device 12 is shown as being wall or ceiling mounted in the embodiments mentioned above, the present invention is not so limited. The intermediary device 12 may be embodied in a device which, for example, is placed on an end table, a shelf, the top of a device 14, etc. For example, the embodiment shown in FIGS. 1B-1E could be modified so that they do not have a plug 36 but, instead, have a cord with a plug (not shown) on the distal end thereof, with the plug being inserted into an electrical outlet, such as wall receptacle 1608 of FIG. 15. Alternatively, plug 36 may be retractable and base 24 may include a plug into which the cord may be inserted in a manner that allows for the device to be flush with the surface on which it is placed. The embodiments of, for example, FIGS. 3, 4, 6, 7, and 9-16 can be similarly reconfigured to sit on a surface and be connected by a cord to an electrical outlet.

Figure 17:
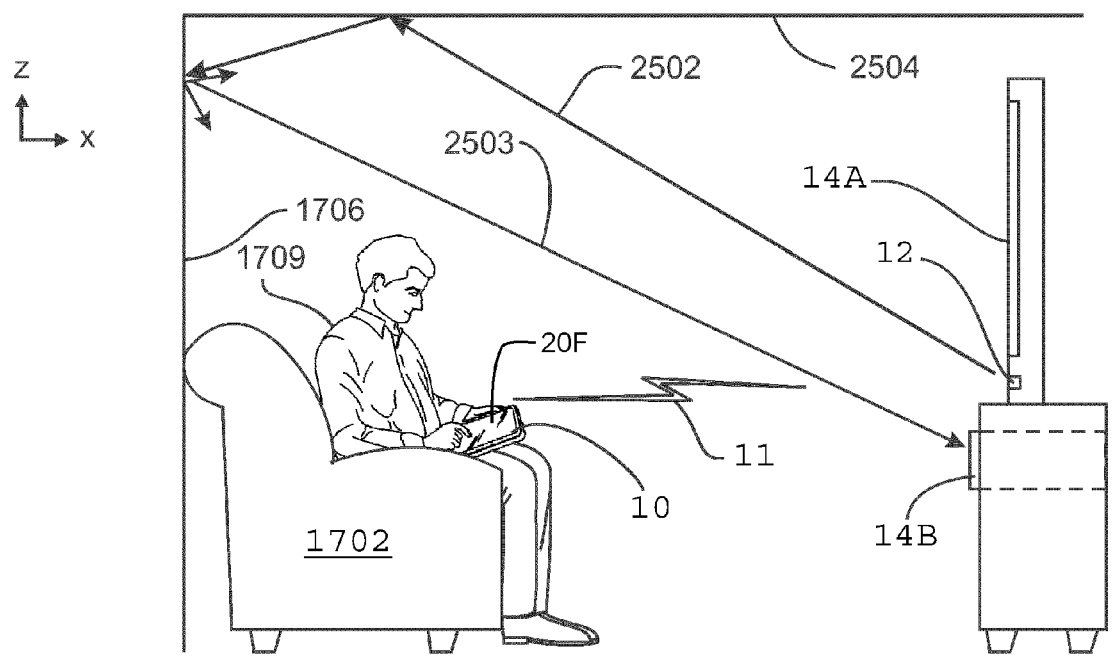
FIG. 17 illustrates an embodiment wherein the intermediary device is included within a television.

FIG. 17 illustrates an embodiment wherein the intermediary device 12 is included within a television 14A. The intermediary device 12 has a plurality of IR LEDs pointing outward from the surface of the television 14A. Some of the LEDs preferably point generally upward, some straight ahead, some generally to the left, some generally to the right, and some at intermediate positions, such as upwardly to the left, upwardly to the right, etc. LEDs pointing generally downward are also possible, although not preferred as generally being unnecessary to obtain the required coverage and reliability of transmission. When a user 1709 commands a remote control 10 to control a remote electronic device 14, the remote control 10 transmits an RF signal 11 (such as a Bluetooth signal) which is received by the intermediary device 12 in the television 14A. If the signal is intended for the television set 14A alone then the command may be passed directly to the control logic (not shown) in the television set by any desired communication path (not shown), such as but not limited to a serial bus or a parallel bus. If the signal is not intended for the television 14A (or even if it is) but is intended for another device, such as a disc player 14B, then the intermediary device broadcasts the command as an IR signal. The IR signal that is directed in the −x direction into the room, in this example, is absorbed by furniture 1702 (such as a couch) or even by the user, and is unlikely to reach the device 14B. The infrared light 2502 that is directed with a component in the −x direction and +z direction toward the ceiling 2504 is reflected from the ceiling 2504, off the wall 1706, and the twice-reflected IR signal 2503 can, however, reach the device 14B with sufficient signal strength to reliably control the device 14B.

In an alternative embodiment the intermediary device 12 could be included within another device, such as device 14B. The operation would be still be the same. Although including the intermediary device 12 in a device which is low to the floor will not be a problem with respect to the reliable reception of the RF signal, such placement could adversely affect the reliability of reception of the IR signal transmitted by the intermediary device 12 in the device 14B. Therefore, preferably, a device 14B which includes the intermediary device 12 should be placed in a position which is not too close to the floor.

Some examples of other devices in which the intermediary device 12 may be included are: content serving, displaying, transmitting, or repeating devices, media devices, cable/satellite/fiberoptic boxes, recording equipment, DVR, internet video box, gaming devices and consoles, personal devices, computing devices, networking devices, routers, home automation devices, stereo systems, audio amplifiers, video cassette recorders, compact disc players, DVD players, Internet video boxes, satellite and other receiving systems, fire, security or other monitoring systems, light fixtures, lamps, home or office automation systems, control systems embedded into appliances or furniture, etc. It should be noted that the intermediary device 12 need not control or even be in communication with the device in which it is installed. Therefore, for example, if a wall clock has the ideal location for reliable control of the devices 14, the intermediary device 12 could be part of the wall clock.

Generally, the number of the IR LEDs used in the various embodiments is not critical. Too many LEDs, however, would be wasteful of energy and resources and might unnecessarily increase the cost, power consumption or heat generation of the intermediary device, or unnecessarily decrease the operating lifetime of the intermediary device. Too few LEDs, conversely, may lead to inadequate signal power or coverage so that the IR signal might not reach a desired location in a room, or a single LED failure might seriously reduce the reliability of the controlled devices 14 receiving the transmissions from the intermediary device 12. Likewise, also only one driver, or a few drivers, might be used to drive the IR LEDs, a single driver failure might seriously reduce the reliability of the controlled devices 14 receiving the transmissions from the intermediary device 12. Conversely, using a separate driver for each IR LED might be wasteful of energy and resources and might unnecessarily increase the cost, power consumption or heat generation of the intermediary device, or unnecessarily decrease the operating lifetime of the intermediary device. Methods for activating only selected IR LEDs, or selected strings of IR LEDs, or controlling the power level of the IR LEDs or strings thereof, are described hereinbelow.

Figure 1B:
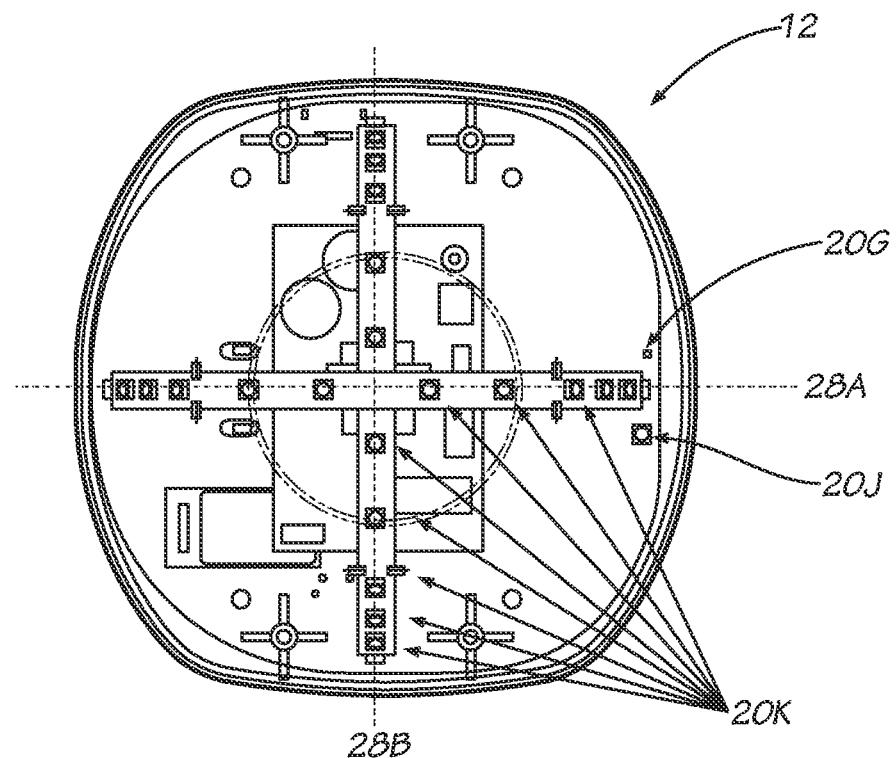
FIGS. 1B-1E are illustrations of a preferred embodiment of an intermediary device.
Figure 1C:
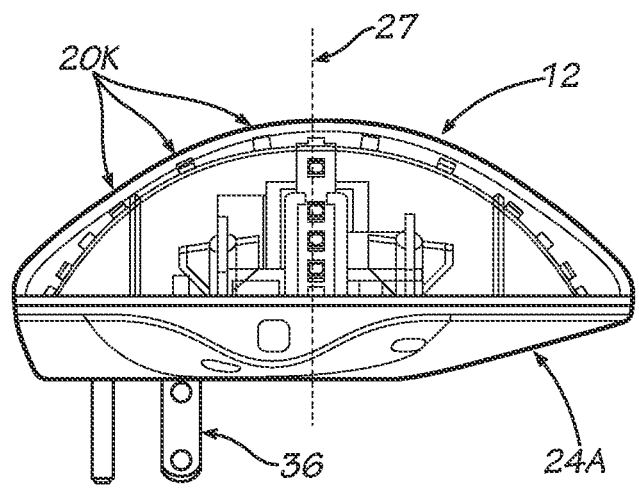
Figure 1D:
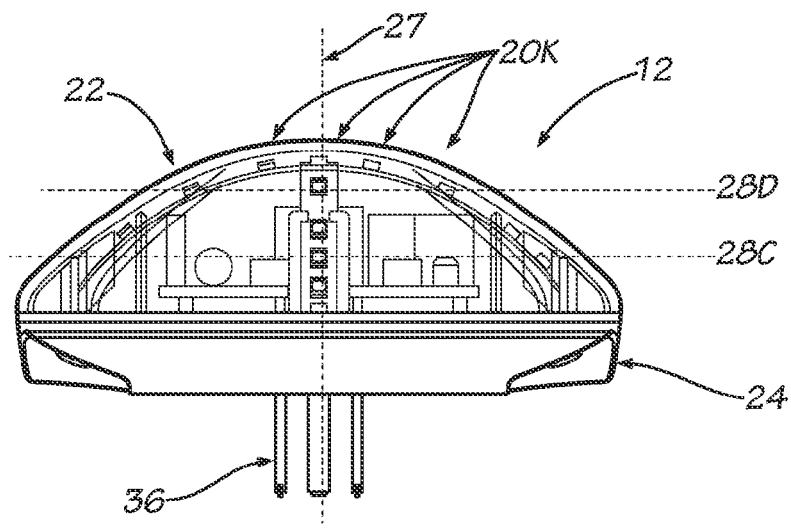
Figure 1E:
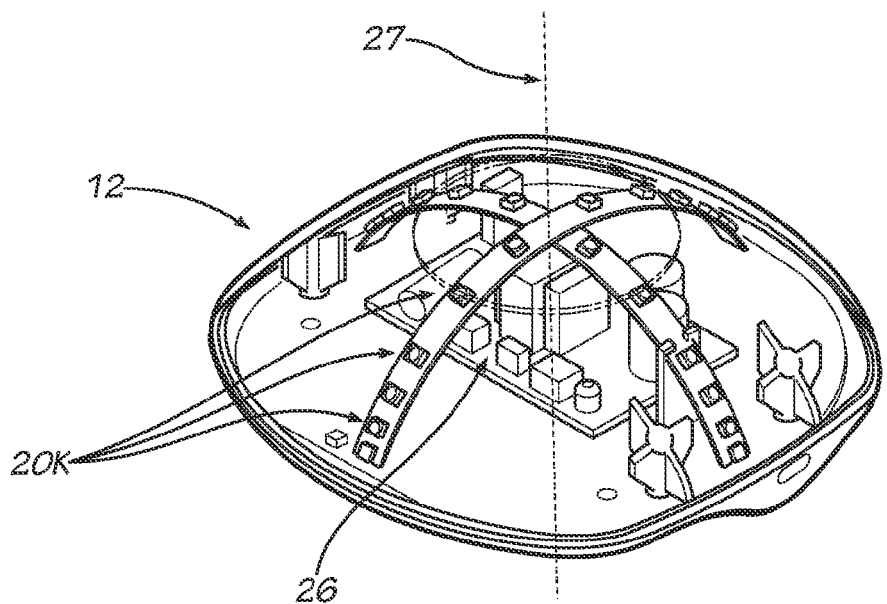

It has been found, however, that certain IR LED characteristics and configurations provide improved performance, even with respect to prior art devices which may use high-power LEDs. Therefore, in certain preferred embodiments, the IR LEDs have a large half-angle of transmission, as discussed herein, and are preferably arranged so that the IR LEDs 20K form light output planes, that is, "planes" of emission. FIG. 1B, for example, shows two planes 28A, 28B of transmission. Other, multi-planar configurations—such as ones depicted in FIGS. 12-16—are, of course, possible, such as three planes, four planes, etc. The use of one or more emission planes distributes the IR emissions along the plane (s), thereby increasing the likelihood that the IR transmission will be reach the desired device 14 with sufficient strength to control the desired device 14, even after one or more reflections or a long travel path. Also, LEDs 20K shown in FIGS. 1B-1E at a common height with respect to the base 24 can form a positional plane, such as planes 28C and 28D. Planes (not shown) at other angles may also be formed by appropriate selection of LEDs 20K. Preferably, except for a possible common LED where two planes intersect, none of the LEDs 20K in one positional plane 28 are also in another plane 28. Even more preferably, none of the LEDs 20K in one positional plane 28 are also in another positional plane 28.

Preferably, but not necessarily, at least one positional plane is perpendicular to the surface on which the intermediary device 12 is mounted. For example, considering FIGS. 1B-1E, the planes 28A and 28B are perpendicular to the wall outlet (and therefore to the wall) into which the device 12 is plugged, but planes 28C and 28D are parallel to that same wall.

In one embodiment, the optical axes of the LEDs in a positional plane are aligned such that the optical axes define an emissive plane which is the same as the positional plane. In another embodiment, the optical axes of the LEDs in a positional plane are offset so that any emissive plane formed is not the same as the positional plane.

The use of one or more emissive planes increases the strength of the IR emissions in the emissive plane(s), thereby increasing the likelihood that the IR transmission will have sufficient strength to control the desired device 14, even after one or more reflections or a long travel path.

Other shapes and configurations may also be used, as desired for functional or even aesthetic considerations. Some other shapes are, by way of example and not of limitation, a truncated cone, a cylinder, a hemicylindrical shape, a bar or block, a circular shape (with or without the LEDs being arranged in a smiling face), and a pyramid.

In addition, although a two-prong plug 36 has been shown in FIGS. 6 and 7, a three-prong, such as a NEMA 5-15 plug, may be used, as shown in FIGS. 8, 10, 12, 14, 15 and 16, or vice versa; the three-prong plug and receptacle being preferred for safety reasons, the two-prong plug being intended primarily for use in older locations which have the two-prong receptacles. In addition, instead of a pronged plug, a screw-in plug, such as an Edison type E26 screw plug, may be used where the available outlet is an Edison type E26 socket, as shown in FIG. 13. This screw plug may be useful where it is desired to screw the intermediary device into an available light bulb socket in, for example, a lamp or even a ceiling fixture. Of course, the intermediary device may also be hard-wired into an available wall-mounted or ceiling-mounted electrical junction box. Placement of the intermediary device 12 at a high level or on the ceiling provides that the intermediary device emits the IR radiation downward to the controlled devices 14, which may also avoid blocking of the IR radiation by persons or furniture in the room.

In addition, although in the shapes illustrated and described herein, the LEDs are positioned to emit generally perpendicularly outward from the surface, that is not a requirement. Some or all of the LEDs may be installed to emit at a desired angle with respect to the surface on which it is located. "Located" includes installations where the LED is outside of the surface, where the LED is inside of the surface but the IR signal can pass, such as through a hole or an IR-transparent material, and where the LED is within the surface but the IR signal can pass.

The user may therefore employ any convenient wireless device 10 (e.g., a handheld device, a tablet, laptop, etc.) to control a variety of IR-receiving devices 14 via the intermediary device 12. This is preferably accomplished by the wireless device 10 being an RF device and by the intermediary device 12 receiving the RF signal and causing corresponding IR signals to be emitted by a plurality of high-power IR LEDs. The IR signals have sufficient power to reflect or bounce off various items such as walls, ceiling, floor and obstructions before being received by the controlled devices 14.

Thus, the intermediary device 12 can be controlled by any device which can transmit an RF signal which can be received by the interface box 12, and which contains the necessary information for the interface box 12 to generate an appropriate IR signal. Some additional examples of such control devices 10 are desktop, notebook, and laptop computers, cellular phones, cordless phones, smartphones, Android operating system based phones, iPhones manufactured by Apple Inc., ebook readers, game controllers, consoles and systems, etc. The intermediary device 12 may also be controlled by any device which can be used with a wired-connection via the USB or other interface port 20H of the intermediary device 12. Some examples of such devices are desktop and laptop computers, corded phones, etc. The intermediary device 12 may also be controlled by an intermediate controlling device (such as a second IR-emitting device in a nearby room). Also, a remote device 10 with a user interface may control the intermediary device 12 through one or more intermediate devices (not shown). For example, a cellular phone may control the intermediary device 12 by using the IEEE 802.11 protocol and transmitting commands to a wireless router which then transmits the commands using IEEE 802.11 protocol to the intermediary device 12. In another embodiment, an application on a cellphone transmits the commands over the EDGE data protocol for a cellular network to a tower, which directs the commands over a wired (or optical fiber based) network to a cable modem and then to a wireless router, which transmits the command over IEEE 802.11 to the intermediary device 12.

It will be appreciated that the intermediary device 12 may require a security code for certain programming functions and even to control selected devices, or to control selected devices at a particular time of day. For example, a security code may be required in order to turn the television on after 11 PM or before 8 AM, or when a device other than the remote control 10 is used, in which case the remote control 10 may have a device ID number which is assigned by, or registered with, the intermediary device 12.

The intermediary device 12 may also control more than one of a particular type of device 14. For example, the user might select "TV2" on the remote control 10 and then press the Power Off button to turn off a television that the user had inadvertently left on in another room. The limiting factor being only that the IR signal must be able to reach TV2.

Alternatively, there might be two or more intermediary devices 12 in various rooms. Thus, when the user presses TV2, and then Power Off, the RF transmission easily passes into the different rooms in the house and an intermediary device 12 in the same area as TV2 will then transmit an IR signal for TV2 to turn off.

In a further embodiment, one intermediary device 12 may communicate with another intermediary device 12 in a different area by an RF signal or even via a wired-connection signal (across a network such as via interface 20H or using an X10 system across the AC electrical power system for example). Thus, the range of operation can be thereby extended.

In a further embodiment, an intermediary device 12 or the remote control 10 may determine the intermediary device 12 which would be most effective for communicating the desired signal to a particular device 14. The intermediary device 12 may analyze the relative strength of the communication connection with the remote control 10 to determine the best method for communicating the signal to the device 14 to be controlled and the best method for communicating with the remote control 10. For example, intermediary device 12 in the living room may receive a stronger RF signal from a remote control 10 than an intermediary device 12 in the bedroom, and thus the intermediary device 12 in the living room communicates with the remote control 10 and the control signal is transmitted by RF at a higher output power to the intermediary device 12 in the bedroom which subsequently controls the television in the bedroom. A first intermediary device 12 may compare the RF signal strength from a remote control 10 with the RF signal strength received by a second intermediary device 12 from the first remote control 10 and the intermediary device 12 receiving the stronger RF signal emits the IR signal to control a device 14.

One of the remote control 10, the intermediary device 12, or some network device (not shown) may determine the relative position of the remote control 10 in order to efficiently communicate with the remote control 10 with a higher reliability or signal to noise ratio, to cause the output power level of the remote control 10 to increase to achieve this goal, or to cause the output power level of the remote control 10 to be reduced to conserve battery power and/or to reduce interference with other devices.

Some users may have similar or the same equipment to be controlled in multiple rooms. For example, a particular model DVR with digital cable television receiver may be located in the living room and the same model may be located in the bedroom. In this case a remote control 10 and/or an intermediary device 12 may have or transmit an identifier tag representing a unique one of two or more identical devices. For example, the DVR with digital receiver in the living room may be denoted on the handheld graphical user interface as "LR-DVR" and the DVR with digital receiver in the bedroom may be denoted on the graphical user interface as "BR-DVR".

In another embodiment, the intermediary device 12, in addition to IR emissions, also has a transmitter (such as item 20 of FIG. 2A) to transmit RF instructions to the controlled device 14. This allows the same intermediary device 12 to be used to control both devices which use RF signals and devices which use IR signals. In another embodiment, the intermediary device 12 may also have an ultrasonic transmitter (not shown) to control device which still use ultrasonic signals for control.

In another embodiment, the intermediary device 12 stores the signal characteristics for controlling a device 14 and can communicate these characteristics to a remote control 10 upon connection to the intermediary device 12 or by causing the remote control 10 to quickly "learn" the characteristics from the intermediary device 12.

A television or other display or device 14 which includes an intermediary device 12 may control other remote devices 14 by transmitting infrared control codes or RF signals as previously described. In addition the functions described above, the intermediary device 12 in the device 14 may also emit control or synchronization signals to photodetectors on IR shutter glasses for 3D display of content on the television or display.

The intermediary device 12 may be disposed on an outer surface of a device 14 or it may be disposed within the device 14 with an IR-transparent window so that the intermediary device 12 can effectively transmit the IR commands. The IR may also be generated by an IR light source which is a component within the backlight of a device 14. For example, a display with an edge-lit backlight may comprise one or more visible LEDs for the display, and IR LEDs disposed along one or more edges for the transmission of the IR commands. By incorporating the IR LEDs into the backlight the IR LEDs (or a window in front of IR LEDs) do not need to occupy an outer surface area of the display, so the display may have a smaller form factor, reduced volume, smaller frame or bezel, etc. In this example, the IR light can be emitted through the active area of the display along with the visible light or along one or more edges thereof.

The remote control 10 may also have a graphical user interface (GUI). This allows the user to create an individual page or screen for each device 14. For example, the GUI may have one page for a TV, one page for a receiver, one page for a DVR, one page for a Blue-Ray Disc player, etc. Techniques for switching between pages of a display, expanding pages to include additional functions, selecting preferred functions for standard display, use of home pages for different users or different devices 14, etc., are well known.

The remote control 10 and/or the intermediary device 12 may also be used to program one or more commands to be automatically executed and transmitted at a defined time. For example, to present the impression that someone is at home, the remote control 10 and/or intermediary device 12 may be programmed to turn the TV on at 8:00 PM, and to change the channel at 9:00 PM, and to turn it off at 10:00 PM on one day, and different times and effects on another day. With appropriate security measures, these commands may also be executed from a distance, such as via a cellular telephone interface, an Internet interface, etc.

The IR LEDs preferably emit light with a peak wavelength within the range of 700 nanometers to 1000 nanometers. In another embodiment, the peak wavelength of emitted light is within the range of 870 nanometers and 970 nanometers. The IR LEDs are preferably modulated with one or more carrier frequencies within the range of 30 kHz to 60 kHz, but carrier frequencies higher than 60 kHz or lower than 30 kHz may also be used if desired.

Although IR LEDs are preferred for reasons of efficiency, devices which also emit visible light may be used, if desired. The only limitation being that the device used ought to be capable of being modulated so that the desired IR command is transmitted.

Preferably, the IR light source, such as an IR LED, has an angular light output profile which is a substantially Lambertian emitter, LED with an angular full width at half maximum (FWHM) intensity greater than 100 degrees in at least one output plane, LED with an angular FWHM intensity between 100 and 130 degrees in at least one output plane, LED with an angular FWHM intensity between 60 and 100 degrees in at least one output plane, or LED with an angular FWHM intensity between 20 and 60 degrees in at least one output plane.

An un-lensed LED is one without a curved light transmitting refractive lens with a radius larger than a dimension of the light-emitting surface of the LED chip(s) or die(s), the higher angle light rays are not refracted toward an optical axis and more light is distributed across a wider angle. Un-lensed surface mount IR LEDs typically have wider angular output than lensed surface mount or non-surface mount LEDs. Surface mount LEDs have a smaller form factor (thinner) than comparable output non-surface mount LEDs. By using un-lensed surface mount LEDs, a small form factor can be achieved for the light-emitting device, more LEDs may be arranged on a surface, or the light-emitting device may have a smaller volume, thus lowering manufacturing materials and costs, or enabling small form factor applications such as an intermediate plug and power receptacle for an Edison type E26 light bulb or an AC electrical power receptacle where space and volume may be limited.

If a lens is used, the lens, cover, or bulb may be volumetrically diffuse or have surface relief diffusion properties, and may be tinted to absorb radiation within a selected range, such as between 400 nanometers and 700 nanometers.

Preferably, each LED disposed on the intermediary device 12 may be considered to have an optical axis with an inclination angle, theta, and azimuth angle, phi. For convenience of discussion herein, the zenith axis (+z direction) is in the "Up" or +z direction with respect to a flat, upright wall (e.g., 1607 in FIG. 15), the azimuth axis (+x direction) is perpendicular to the wall, and the lateral axis (+y direction) is parallel to the wall. Also for convenience of discussion herein, the optical axis of an LED are an azimuth angle (phi), that is, the angle from the azimuth axis (+x axis) to the projection of the intermediary device 12 optical axis onto the x-y plane, and a zenith angle, that is, the angle from the zenith (+z direction) to the projection of the intermediary device 12 optical axis in the x-z plane. The light emitting device preferably comprises an IR LED with an optical axis with a zenith angle within the range of −45 degrees to +135 degrees and an azimuth angle within the range of −45 degrees to +45 degrees.

In another embodiment, the zenith angle of the optical axis of the LED is within the range of −20 degrees to +135 degrees and the azimuth angle is within the range of −45 degrees to +45 degrees.

In another embodiment, the zenith angle of the optical axis of the LED is within the range of −45 degrees to 0 degrees and the azimuth angle is within the range of −45 degrees to +45 degrees.

For non-symmetrical light output profiles, for the purposes disclosed herein, the optical axis of the intermediary device is the optical power weighted average angle of the output from the LEDs.

In another embodiment, the light-emitting device has an optical axis with a zenith angle within the range of 0 degrees to +135 degrees and an azimuth angle within the range of −45 degrees to +45 degrees.

In one embodiment, the intermediary device 12 has a total modulated radiant IR output greater than one selected from the group of 50 milliwatts, 100 milliwatts, 200 milliwatts, 300 milliwatts, 400 milliwatts, 500 milliwatts and 600 milliwatts.

In another embodiment, the intermediary device 12 has a total time averaged radiant IR output greater than one selected from the group of 50 milliwatts, 100 milliwatts, 200 milliwatts, 300 milliwatts, 400 milliwatts, 500 milliwatts and 600 milliwatts.

In another embodiment, the intermediary device 12 comprises one selected from the group of more than 2 IR LEDs, more than 4 IR LEDs, more than 6 IR LEDs, more than 8 IR LEDs, more than 10 IR LEDs, more than 12 IR LEDs, more than 14 IR LEDs, and more than 16 IR LEDs. The IR LEDs preferably have an average individual radiant infrared light output between 25 milliwatts and 45 milliwatts when driven with a current of 100 milliamps.

In another embodiment, the intermediary device 12 may be controlled via the user interface 20F, the IR receiver 20J, the RF receiver 20A, or the interface 20H, to increase the IR output by 20%, 40%, 60%, 80%, 100%, 150%, 200%, or 300%, or some other desired or value, or to decrease the IR output by some selected or desired value.

All of the IR LEDs may have substantially the same light output profiles or the IR LEDs may have different angular light output profiles so as to achieve different IR radiation patterns.

The IR LEDs preferably have their respective optical axes aligned in different directions, although some LEDs may be oriented in the same direction. In one embodiment, the orientation angle of one or more IR LEDs is one selected from the group comprising −45 degrees, 0 degrees, 45 degrees, 90 degrees, 135 degrees, 180 degrees, and 225 degrees.

In another embodiment, the orientation angle of one or more IR LEDs is within the range selected from the group of −45 degrees to 0 degrees, 0 degrees to 45 degrees, 45 degrees to 90 degrees, 90 degrees to 135 degrees, 135 degrees to 180 degrees, 180 degrees to 225 degrees, and −45 degrees to 225 degrees.

In another embodiment, the intermediary device 12 comprises at least one IR light source wherein at least one of the position and angular orientation can be adjusted by the user. For example, the intermediary device 12 may comprise two IR LEDs disposed at the end of a flexible rod or tube (such as a "gooseneck" type flexible arm as used in microphones or lights). In another example of one embodiment, a plug-in "wall wart" type AC power plug comprises one, two, or more than two flexible arms that extend from the base of the intermediary device 12 that are repositionable and are suitably rigid to substantially sustain their position and orientation (such as a gooseneck type device).

In another embodiment, the intermediary device 12 comprises extendable IR LEDs disposed proximate to the end of flexible wires or cables such that the wires may be positioned and oriented substantially independent of the power supply or base of the intermediary device 12. This allows the intermediary device 12 to be concealed while still allowing the IR LEDs to be positioned so that they are not obtrusive or aesthetically objectionable, and do not block the IR sensor of the device 14, but still provide for effective transmission of the IR signals.

In one embodiment, the base unit of the intermediary device 12 has flexible wires, cables, or cords comprising IR LEDs disposed proximate to the end and the cords are retractable or self-retractable (such as used with some headphone earplugs and tape measures) and the cord length may be locked in place (as in a self-retracting, lockable tape measure).

In another embodiment, at least one region disposed near the light-emitting end of the cord, wire, or cable comprises an adhesive material to affix the end position or orientation of the cord, wire, cable, or light-emitting region.

In a further embodiment, at least one end region of the cord, wire, or cable comprises a clip, magnet, hook or loop region of a hook-and-loop fastener.

In another embodiment, the light-emitting device comprises at least one hollow or solid fiber optic lightguide that transmits IR light from the base of the intermediary device 12 to the ends of the fiber optic lightguide where it may exit from the lightguide.

It will be appreciated that the installation of polarized receptacles and three-prong receptacles is not standard. For example, a three-prong receptacle may have the ground prong socket at the top or at the bottom or, if the receptacle is installed sideways, to the left or to the right. Therefore, an embodiment which directs more of the IR radiation upward than downward will be properly oriented if the ground prong socket is at the bottom of the receptacle, but will be upside down, directing more of the IR radiation toward the floor, if the ground prong socket is at the top of the receptacle. Therefore, in one embodiment, the up or down direction of the intermediary device 12 may be configured to compensate for the orientation of the receptacle such as by rotating the plug, or disconnecting, rotating, and re-connecting the plug.

In another embodiment, the IR LED configuration on the box 12 is the same on top and on bottom, and moving a selector switch designates which is the top side so that some or all of the IR LEDs on the bottom side will be deactivated.

In one embodiment, the light output profile of the intermediary device 12 is one selected from the group of omnidirectional, non-omnidirectional, and substantially hemispherical.

In another embodiment, the light output profile of the intermediary device 12 in a spherical coordinate system with the zenith in the up direction when plugged into an electrical power receptacle has an optical axis with an angular output range comprising light output with an inclination angle greater than one selected from the group of −10 degrees, 0 degrees, 10 degrees, 20 degrees, 30 degrees, 40 degrees, and 45 degrees.

In one embodiment, the percentage of the total light flux emitted from the intermediary device 12 at an inclination angle less than 90 degrees is greater than one selected from the group of 5%, 10%, 20%, 30%, 40%, 50%, 60% and a percentage between 0% and 99%.

In another embodiment, the percentage of the total light flux emitted from the intermediary device 12 at an inclination angle less than 0 degrees is greater than one selected from the group of 2%, 5%, 10%, 20%, 30%, 40%, 50%, 60% and a percentage between 0% and 99%.

It will be appreciated that, because of the power levels involved, the various IR signals may take different paths in the room and still arrive at the device to be controlled with sufficient power to do so. Thus, one signal may take a direct path from the intermediary device 12 to the controlled device 14, and another signal may take a more circuitous path, reflecting off one or more surfaces to arrive at the device 14. Thus, in theory, there exists the potential for interference between the direct and reflected signals. In most situations, however, this interference is minimal or nonexistent. Assume that a room has a length of 10 meters, that the direct path length is one meter, and the reflected path length is twice the length of the room, that is, 20 meters. The difference between the direct path and the reflected path will be 19 meters, which corresponds to a delay of approximately 63 nanoseconds between the direct signal and the reflected signal. With an IR carrier frequency of 56 kHz, the period of the IR carrier is approximately 17.86 microseconds. The reflected signal will only be phase shifted (delayed) from the direct signal by slightly over 1 degree. Thus, any interference would be minimal, even in a larger room.

In one embodiment, the user can cause the intermediary device 12 to enter into a calibration or configuration mode such that light is emitted from selected ones of the IR LEDs. In this embodiment, the user can use the user interface 20F to selectively activate an IR LED to determine whether it is effective in controlling a desired device 14 and then instruct the intermediary device 12 to use only those designated IR LEDs when a command is to be transmitted to that particular device.

In another embodiment, the user can cause the intermediary device 12 to sequentially activate each IR LED to send a signal to a selected device and the user can use the user interface 20F to specify whether the signal emitted by that IR LED was successfully received by the device to be controlled. The intermediary device 12 will then use only those designated IR LEDs when a command is to be transmitted to that particular device. For this purpose, for example, the test command may be any desired command, but is preferably one for which the results are easily noticed, such as "power on/off", or "channel up" or "channel down". When the command is executed successfully, the user can notify the intermediary device 12 to use only those designated IR LEDs when a command is to be transmitted to that particular device. The IR LEDs that did not reliably control the device may be driven at a lower power level or not driven at all, thus saving power and reducing ambient IR noise that could inadvertently affect other, similar, devices, such as those in a different room. This training, calibration, or configuration is preferably repeated for each devices to be controlled.

In another embodiment, groups of IR LEDs are tested, such as all top-mounted IR LEDs, rather than testing each individual IR LED.

In another embodiment, each LED (or group of LEDs) is preferably tested as above but, in addition, the drive current for an LED is optimized by driving each LED (or group) with different currents to determine the minimum current level necessary for reliable operation. For example, assume that an intermediary device 12 plugged into a wall emitting IR radiation with a zenith axis in the up direction, and a first IR LED, with an optical axis at an inclination angle, theta, of 70 degrees, and azimuth angle, phi, of 0 degrees (in a spherical coordinate system) turns off the TV with a drive current of 200 mA (after cycling up from 0 mA, 50 mA, 100 mA, and 150 mA), and that a second IR LED with an optical axis at a zenith angle, theta, of 10 degrees, and azimuth angle, phi, of 0 degrees (almost straight up) turns off the TV with a drive current of 100 mA. IR LED number 2 will therefore be used, if in a (power saving) reduced power mode, to turn off the television. Thus, the user can select the minimum power for reliable operation for a particular IR LED and a particular device 14 and, in addition, can also select that the IR LED which uses the minimal current will be used.

In one embodiment, the current is increased above the threshold current by less than one selected from the group of 10%, 20%, 30%, 40%, 50%, 60%, 80%, 100% and 150% in order to account for changes in the ambient surroundings (such as moving furniture or a person walking in front of the light-emitting device) so that device to be controlled will reliably receive a sufficiently strong signal.

Although reference is made above to testing of individual IR LEDs, that is possible if each IR LED is driven by a separate driver. Preferably, however, each driver controls a series string of IR LEDs, so the testing would actually be of such series strings, rather than individual IR LEDs.

In another embodiment, two or more IR LEDs (or strings of IR LEDs) are selected for controlling each device 14 in order to provide a specific level of redundancy, such as in the case of furniture being moved, or a person walking, into the path of the light from the first IR LED.

The learning mode for the above selection of the IR LEDs (or strings of same) may be accomplished via the user interface 20F, as indicated, or via an external device wired to, or in wireless communication with, the intermediary device 12. For example, the remote control 10 or a laptop (10 in FIG. 17) could be conveniently used for such learning and setup operation via, for example, transceiver 20A or interface 20H.

In another embodiment, a display may indicate which IR LEDs (or strings) are being tested or have been selected, the orientation of the IR LED, the current drive power of the LED being tested, the time remaining to verify that the device successfully communicated with the device to be controlled (such as 5 second timer counting down before the power of the LED is increased to give the user time to verify the communication was successfully sent), a pause button to pause the setup, and other commands. Preferably, this type of display would be on a connected laptop or other computer, not part of the intermediary device 12, so as to minimize the cost, size, and operating power of the intermediary device 12 as such a display generally would be infrequently used.

In one embodiment, the intermediary device 12 comprises a timer or programmable logic controller and memory that permits the delayed execution of commands or time based execution of commands for controlling a device 14. For example, the user can instruct the intermediary device 12 to turn off a television 14 and a stereo by an IR command at a time 2 hours in the future, or at a specified time, and leave the room such that the intermediary device 12 sends the commands two hours later without further action by the user. Similarly, other command functionality such as "sleep" functions (analogous to common digital alarm clocks or televisions) may be incorporated into the intermediary device 12.

In one embodiment, the power supply 20D of the intermediary device 12 operates from AC power provided via the wall or other AC outlet. The intermediary device 12 may also have a battery backup or even operate solely from battery power as larger batteries, having more capacity, can be used as compared with the batteries typically used in a standard IR remote control.

In another embodiment, the intermediary device 12 may receive control commands via interface 20H through a wired power line networking (PLN) channel. For example, the IR light emitting device may receive control commands through the existing household electrical power wiring network to which the device is plugged using IEEE 1901 (e.g., Home-Plug AV) or ITU-T G.hn G.9960 standards.

Thus, generally speaking, remote control systems and methods for reliably controlling another device are disclosed. The remote control system includes a remote control device and an intermediary device. The remote control device includes a user interface to receive a device designation and a command for the designated device, and transmits a corresponding command via an RF signal.

The remote control device, in one version, may have a processor to receive the device designation and command from the user interface and to provide a corresponding device designation and command signal, and an RF transmitter or transceiver to receive the device designation and command signal from the processor and to transmit a corresponding RF signal.

The remote control device, in another version, may have a processor to receive the device designation and command from the user interface and to generate a corresponding device-specific command signal, and an RF transmitter to receive the device-specific command signal and to transmit a corresponding RF signal.

The intermediary device receives the RF signal and has a plurality of high-power IR generation devices to generate high-power IR signals corresponding to the device designation and command represented by the RF signal.

The intermediary device, in one version, may have an RF receiver to receive and demodulate the RF signal from the RF transmitter to provide the device designation and the command, and a processor to receive the device designation and the command from the RF receiver and to generate a corresponding device-specific command drive signal, the plurality of high-power IR generation devices being responsive to the corresponding device-specific command drive signal from the processor to transmit a plurality of device-specific IR command signals.

The intermediary device, in another version, may have an RF receiver to receive and demodulate the RF signal to provide the device-specific command, and a processor to receive the device-specific command from the RF receiver and to provide a corresponding device-specific command drive signal, the plurality of high-power IR generation devices being responsive to the corresponding device-specific command drive signal from the processor to transmit a plurality of device-specific IR command signals.

One method for reliably controlling a device responsive to IR command signals may include receiving a device designation and a command for the designated device, transmitting a corresponding RF signal, receiving the RF signal, demodulating the received RF signal to determine the device designation and command, using the determined device designation and command to generate a corresponding device-specific control signal for the designated device, and transmitting the corresponding device-specific control signal by a plurality of high-power IR signals.

Another method for reliably controlling a device responsive to IR command signals may include receiving a device designation and a command for the designated device, using the device designation and command to generate a corresponding device-specific control signal, transmitting the corresponding device-specific control signal as an RF signal, receiving the RF signal, demodulating the received RF signal to determine the corresponding device-specific control signal, and transmitting the demodulated corresponding device-specific control signal by a plurality of high-power IR signals.

Another method for reliably controlling a device responsive to IR command signals may include receiving an RF signal having information as to a device designation and a command for the designated device, demodulating the received RF signal to determine the device designation and command, using the determined device designation and command to generate a corresponding device-specific control signal for the designated device, and transmitting the corresponding device-specific control signal by a plurality of high-power IR signals.

A method for reliably controlling a device responsive to IR command signals may include receiving an RF signal having a device-specific control signal, demodulating the received RF signal to determine the corresponding device-specific control signal, and transmitting the demodulated device-specific control signal by a plurality of high-power IR signals.

Unless otherwise indicated, all sizes, amounts, value, styles, dimensions, and physical properties mentioned in the specification and/or drawing are exemplary and are not critical. Thus, for example, a length of 2 inches, or a resistance value of 10K ohms, or a component manufacturer and model number, power rating, etc., are exemplary and not limitations.

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. Accordingly, the scope of the invention is to be limited only by the claims below and the equivalents thereof.

What is claimed is:

1. An apparatus, comprising:
an electronic device to process at least one of digital or analog signals, the electronic device being a predetermined one of: a content serving, displaying, transmitting or repeating device, a media device, a cable television box, a fiber optic box, recording equipment, a digital video recorder, an Internet video box, a gaming device, a gaming console, a personal electronic device, a computing device, a network device, a router, a home automation device, a television set, a stereo system, an audio amplifier, a video cassette recorder, a compact disc player, a digital video disk player, an Internet video box, a satellite signal receiving system, a fire monitoring system, a security monitoring system, a home automation system, or an office automation system; and a remote control receiving and transmitting device being at least partially enclosed within the electronic device and having a longitudinal axis substantially parallel to a base plane, the remote control receiving and transmitting device comprising:

a receiver disposed to receive at least one of a radio frequency control signal or a power line control signal, and to demodulate the received control signal to provide a demodulated control signal;

a processor functionally coupled to the receiver to receive the demodulated control signal and to generate a corresponding drive signal;

a plurality of infrared light sources functionally coupled to the processor and responsive to the drive signal to generate a plurality of modulated infrared light emissions to control at least one infrared receiving device, each of the plurality of infrared light sources having an optical axis, a first group of the plurality of infrared light sources being disposed on the apparatus such that the optical axis of each of the plurality of infrared light sources in the first group is at a different angle with respect to the longitudinal axis, the modulated infrared light emissions controlling the at least one infrared receiving device; and a power supply to provide operating power for at least one of electronic device, the receiver, the processor, or the plurality of infrared light sources;

wherein the total infrared power emitted by the plurality of infrared light sources whose optical axis is at an angle of greater than a predetermined angle with respect to the longitudinal axis is greater than the total infrared power emitted by the plurality of infrared light sources whose optical axis is at an angle of less than the predetermined angle with respect to the longitudinal axis, the total infrared power emitted by the plurality of infrared light sources whose optical axis is at an angle of less than the predetermined angle with respect to the longitudinal axis being greater than zero.

2. The apparatus of claim 1 wherein the power supply provides operating power for at the electronic device and at least one of the receiver, the processor, or the plurality of infrared light sources.

3. The apparatus of claim 1 wherein the electronic device is a content serving, displaying, transmitting or repeating device.

4. The apparatus of claim 1 wherein the electronic device is a media device.

5. The apparatus of claim 1 wherein the electronic device is selected from the group consisting of a cable television box, a fiber optic box, a digital video recorder, an Internet video box, a gaming device, a gaming console, a personal electronic device, a computer, a network device, a home automation device, a television set, a stereo system, an audio amplifier, a video cassette recorder, a compact disc player, a digital video disk player, a satellite signal receiving system, a fire monitoring system, a security monitoring system, and an office automation system.

6. The apparatus of claim 1, wherein at least one of the plurality of infrared light sources emits light in a direction generally parallel to the longitudinal axis and the percentage of the power emitted from the light emitting device at an angle greater than 70 degrees from the longitudinal axis is greater than 20% of the total infrared power emitted by all of the plurality of infrared light sources.

7. The apparatus of claim 1, wherein at least one of the plurality of infrared light sources emits light in a direction generally parallel to the longitudinal axis and the percentage of the power emitted from the light emitting device at an angle greater than 70 degrees from the longitudinal axis is greater than 40% of the total infrared power emitted by all of the plurality of infrared light sources.

8. The apparatus of claim 1, wherein the plurality of infrared light sources comprises at least one infrared light source with an optical axis less than 45 degrees from the longitudinal axis, and the infrared light emitting device comprises more infrared light sources with an optical axis greater than 45 degrees than less than 45 degrees from the longitudinal axis.

9. The apparatus of claim 1, wherein the plurality of infrared light sources are oriented to emit more infrared light in a plurality of directions than in other directions.

10. The apparatus of claim 1, wherein the infrared light emitting device is oriented to emit more infrared light upward than downward when the longitudinal axis is generally horizontal.

11. The apparatus of claim 1, wherein the total infrared power emitted by the plurality of infrared light sources whose optical axis is at an angle of greater than about 45 degrees with respect to the longitudinal axis is greater than the total infrared power emitted by the plurality of infrared light sources whose optical axis is at an angle of less than about 45 degrees with respect to the longitudinal axis, the total infrared power emitted by the plurality of infrared light sources whose optical axis is at an angle of less than about 45 degrees with respect to the longitudinal axis being greater than zero.

12. The apparatus of claim 1, further comprising an infrared receiver to receive infrared light control codes, and a memory to store the infrared light control codes, whereby the processor, in response to receiving the demodulated radio frequency control signal, uses the memory to determine the corresponding drive signal.

13. An apparatus, comprising:

an article of manufacture, the article of manufacture being a predetermined one of: a light fixture, a lamp, an appliance, an item of furniture, or a wall clock; and a remote control receiving and transmitting device being at least partially enclosed within the article of manufacture and having a longitudinal axis substantially parallel to a base plane, the remote control receiving and transmitting device comprising:

a receiver disposed to receive at least one of a radio frequency control signal or a power line control signal, and to demodulate the received control signal to provide a demodulated control signal;

a processor functionally coupled to the receiver to receive the demodulated control signal and to generate a corresponding drive signal;

a plurality of infrared light sources functionally coupled to the processor and responsive to the drive signal to generate a plurality of modulated infrared light emissions to control at least one infrared receiving device, each of the plurality of infrared light sources having an optical axis, a first group of the plurality of infrared light sources being disposed on the apparatus such that the optical axis of each of the plurality of infrared light sources in the first group is at a different angle with respect to the longitudinal axis, the modulated infrared light emissions controlling the at least one infrared receiving device; and a power supply to provide operating power to at least one of the receiver, the processor, or the plurality of infrared light sources;

wherein the total infrared power emitted by the plurality of infrared light sources whose optical axis is at an angle of greater than a predetermined angle with respect to the longitudinal axis is greater than the total infrared power emitted by the plurality of infrared light sources whose optical axis is at an angle of less than the predetermined angle with respect to the longitudinal axis, the total infrared power emitted by the plurality of infrared light sources whose optical axis is at an angle of less than the predetermined angle with respect to the longitudinal axis being greater than zero.

14. The apparatus of claim 13 wherein the article of manufacture is selected from the group consisting of an appliance, an item of furniture, a wall clock, a light fixture, and a lamp.

15. The infrared light emitting device of claim 13, wherein at least one of the plurality of infrared light sources emits light in a direction generally parallel to the longitudinal axis and the percentage of the power emitted from the light emitting device at an angle greater than 70 degrees from the longitudinal axis is greater than 20% of the total infrared power emitted by all of the plurality of infrared light sources.

16. The infrared light emitting device of claim 13, wherein at least one of the plurality of infrared light sources emits light in a direction generally parallel to the longitudinal axis and the percentage of the power emitted from the light emitting device at an angle greater than 70 degrees from the longitudinal axis is greater than 40% of the total infrared power emitted by all of the plurality of infrared light sources.

17. The infrared light emitting device of claim 13, wherein the plurality of infrared light sources comprises at least one infrared light source with an optical axis less than 45 degrees from the longitudinal axis, and the infrared light emitting device comprises more infrared light sources with an optical axis greater than 45 degrees than less than 45 degrees from the longitudinal axis.

18. The infrared light emitting device of claim 13, wherein the plurality of infrared light sources are oriented to emit more infrared light in a plurality of directions than in other directions.

19. The infrared light emitting device of claim 13, wherein the infrared light emitting device is oriented to emit more infrared light upward than downward when the longitudinal axis is generally horizontal.

20. The infrared light emitting device of claim 13, wherein the total infrared power emitted by the plurality of infrared light sources whose optical axis is at an angle of greater than about 45 degrees with respect to the longitudinal axis is greater than the total infrared power emitted by the plurality of infrared light sources whose optical axis is at an angle of less than about 45 degrees with respect to the longitudinal axis, the total infrared power emitted by the plurality of infrared light sources whose optical axis is at an angle of less than about 45 degrees with respect to the longitudinal axis being greater than zero.

21. The infrared light emitting device of claim 13, further comprising an infrared receiver to receive infrared light control codes, and a memory to store the infrared light control codes, whereby the processor, in response to receiving the demodulated radio frequency control signal, uses the memory to determine the corresponding drive signal.

* * * * *